United States Patent
Takahashi et al.

(10) Patent No.: US 11,189,958 B2
(45) Date of Patent: *Nov. 30, 2021

(54) CONNECTOR THAT INCLUDES HOLDING BODY WITH COVERING PART

(71) Applicant: Yazaki Corporation, Tokyo (JP)

(72) Inventors: Kazuhide Takahashi, Shizuoka (JP); Eiji Aoki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,223

(22) Filed: Aug. 5, 2020

(65) Prior Publication Data

US 2021/0044052 A1    Feb. 11, 2021

(30) Foreign Application Priority Data

Aug. 7, 2019  (JP) .............................. JP2019-145184

(51) Int. Cl.
*H01R 13/52*      (2006.01)
*H01R 13/516*    (2006.01)

(52) U.S. Cl.
CPC ....... *H01R 13/5205* (2013.01); *H01R 13/516* (2013.01); *H01R 2201/26* (2013.01)

(58) Field of Classification Search
CPC .. H01R 13/5202; H01R 13/42; H01R 13/502; H01R 13/521; H01R 12/58
See application file for complete search history.

(56) References Cited

U.S. PATENT DOCUMENTS

| 8,328,572 | B2* | 12/2012 | Tashiro | H01R 13/5208 |
| | | | | 439/271 |
| 9,033,734 | B2* | 5/2015 | Tanaka | H01R 13/6592 |
| | | | | 439/587 |
| 9,397,440 | B2* | 7/2016 | Mori | H01R 13/405 |
| 9,484,647 | B2* | 11/2016 | Ishikawa | H01R 9/24 |
| 9,524,811 | B2* | 12/2016 | Adachi | B60R 16/0215 |
| 9,966,715 | B2* | 5/2018 | Ishibashi | H01R 13/512 |
| 11,063,387 | B2* | 7/2021 | Aoki | H01R 13/5216 |

(Continued)

FOREIGN PATENT DOCUMENTS

| DE | 10 2015 213 439 A1 | 1/2017 |
| JP | H3-39263 U | 4/1991 |
| JP | 2018-116896 A | 7/2018 |

*Primary Examiner* — Abdullah A Riyami
*Assistant Examiner* — Nader J Alhawamdeh
(74) *Attorney, Agent, or Firm* — Kenealy Vaidya LLP

(57) ABSTRACT

A connector includes an insulating housing that is fixed to a casing of a first device at a communication part through which an opening of the casing of the first device and as opening of a casing of a second device communicate with each other, a conductor unit including a plurality of conductors arranged in a row and an insulating holding body integrally molded with the conductors, and a sealing member that seals between the conductor unit and the housing. Each of the conductors includes a plate-shaped body. The holding body includes a fitting part fitted to the housing, a plurality of covering parts each extending from the fitting part along the body and individually surrounding the body, and a connecting part connecting the adjacent covering parts at a position separated from the fitting part.

13 Claims, 25 Drawing Sheets

(56) References Cited

U.S. PATENT DOCUMENTS

| | | | |
|---|---|---|---|
| 2013/0140055 A1* | 6/2013 | Adachi | B60R 16/0215 |
| | | | 174/113 R |
| 2014/0322973 A1* | 10/2014 | Okamoto | H01R 13/4223 |
| | | | 439/587 |
| 2015/0118905 A1* | 4/2015 | Mori | H01R 13/52 |
| | | | 439/606 |
| 2015/0214655 A1* | 7/2015 | Mori | H01R 13/504 |
| | | | 439/606 |
| 2016/0172784 A1* | 6/2016 | Kataoka | H01R 13/6592 |
| | | | 439/271 |
| 2018/0123305 A1 | 5/2018 | Misu | |
| 2018/0358748 A1* | 12/2018 | Yamanashi | H01R 24/62 |
| 2019/0379154 A1* | 12/2019 | Nishijima | H01R 13/512 |
| 2021/0036458 A1* | 2/2021 | Aoki | H01R 13/42 |
| 2021/0044052 A1* | 2/2021 | Takahashi | H01R 13/5202 |
| 2021/0044053 A1* | 2/2021 | Aoki | H01R 13/502 |
| 2021/0091507 A1* | 3/2021 | Aoki | H01R 9/16 |

* cited by examiner

CONNECTOR THAT INCLUDES HOLDING BODY WITH COVERING PART

CROSS-REFERENCE TO RELATED APPLICATION(S)

The present application claims priority to and incorporates by reference the entire contents of Japanese Patent Application No. 2019-145184 filed in Japan on Aug. 7, 2019.

BACKGROUND OF THE INVENTION

1. Field of the Invention

The present invention relates to a connector.

2. Description of the Related Art

In the related art, there is a connector having a plurality of conductors. Japanese Patent Application Laid-open No. 2018-116896 discloses a device connector including a main housing retaining a bus bar for relaying a power circuit, an electric wire with a connector including an electric wire for relaying a signal circuit and a sub-connector connected to a terminal of the electric wire, and an electric wire retention part connecting with the main housing and retaining the electric wires.

The applicant is considering of integrally molding an insulating holding body with a plurality of conductors to for a conductor unit. Here, from the viewpoint of securing a creepage distance between adjacent conductors, it is effective to provide the holding body with covering parts that cover the conductors, respectively, and to separate the covering parts with a deep slit. On the other hand, when the deep slit is provided between the covering parts, there is a problem in that the holding body may be easily deformed during cooling and the like after molding.

SUMMARY OF THE INVENTION

An object of the present invention is to provide a connector capable of suppressing the deformation of a holding body and securing a creepage distance between conductors.

In order to achieve the above mentioned object, a connector according to one aspect of the present invention includes an insulating housing that is fixed to a casing of a first device at a communication part through which an opening of the casing of the first device and an opening of a casing of a second device communicate with each other; a conductor unit that includes a plurality of conductors arranged in a row and an insulating holding body integrally molded with the conductors; and a sealing member that seals between the conductor unit and the housing, wherein each of the conductors includes a plate-shaped body and terminal parts provided at both ends of the body, respectively, and the holding body includes a fitting part fitted to the housing, a plurality of covering parts each extending from the fitting part along the body and individually surrounding the body, and a connecting part connecting the adjacent covering parts at a position separated from the fitting part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a connector according to an embodiment of the present invention will be described in detail with reference to the drawings. Note that the invention is not limited by the embodiment. Furthermore, constituent elements in the following embodiment include those that can be easily arrived at by a person skilled in the art or those that are substantially the same.

Embodiment

Figure 1:
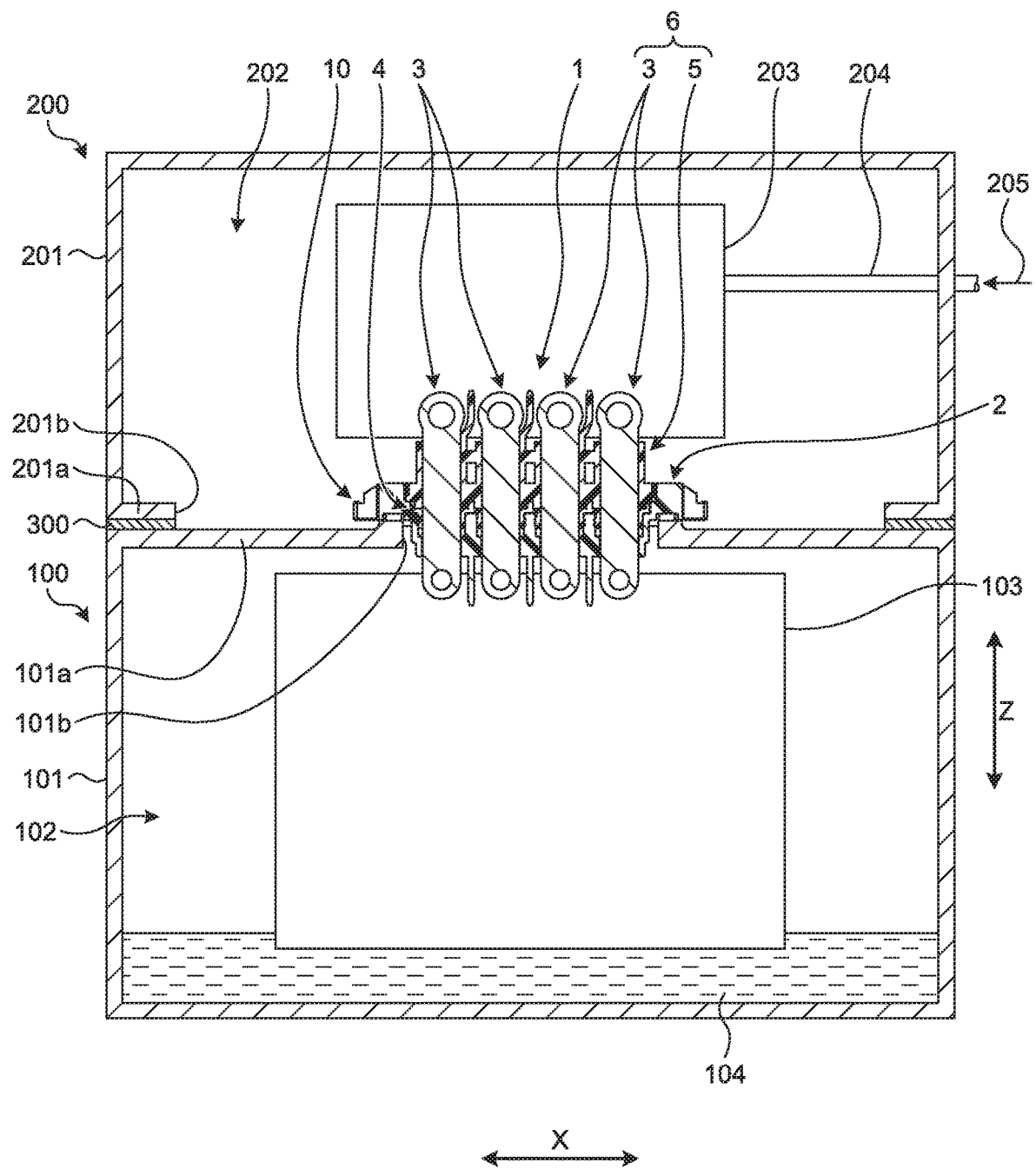
FIG. 1 is a sectional view of a connector, a first device, and a second device according to an embodiment.
Figure 3:
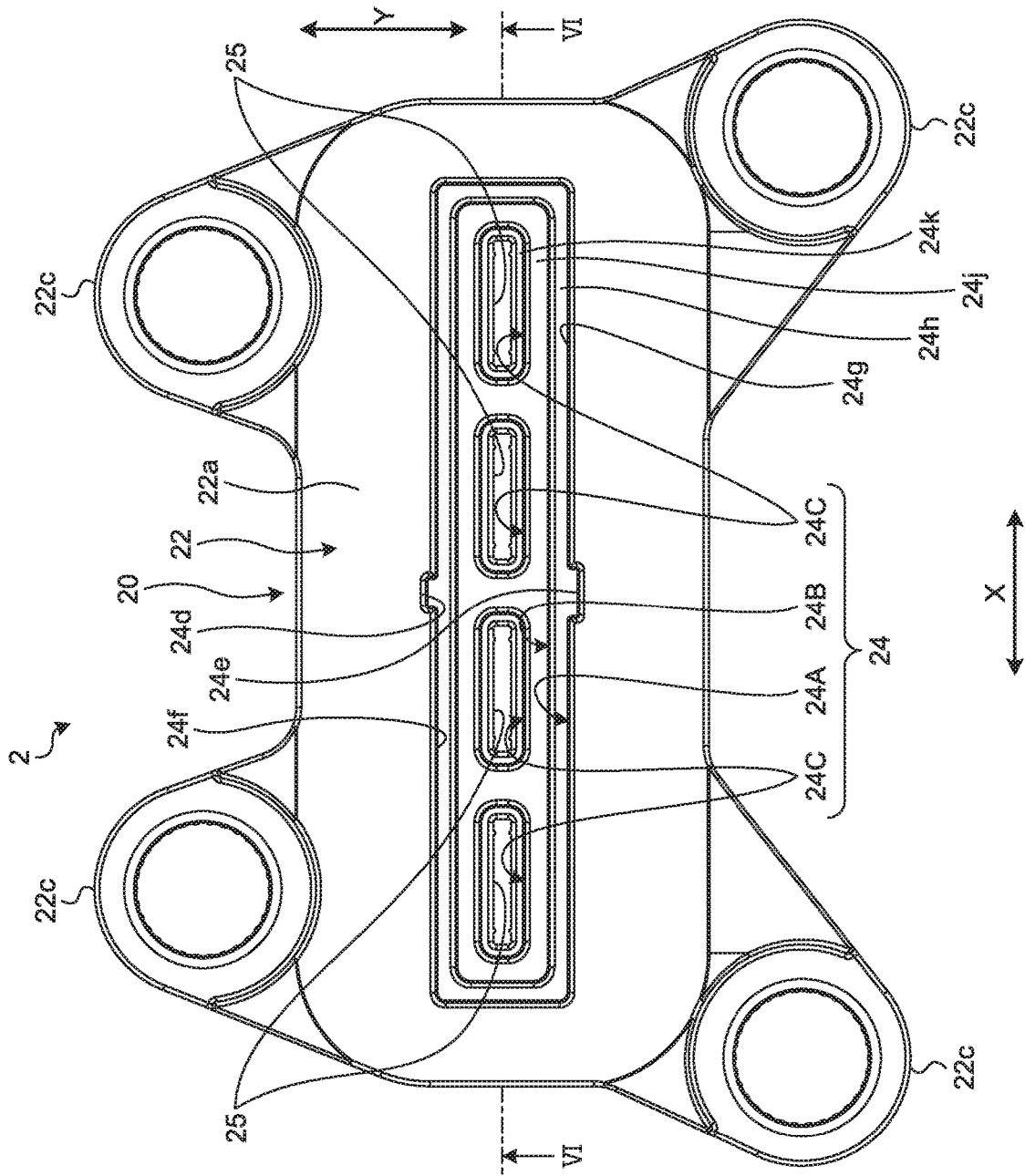
FIG. 3 is a plan view of a housing according to the embodiment.
Figure 4:
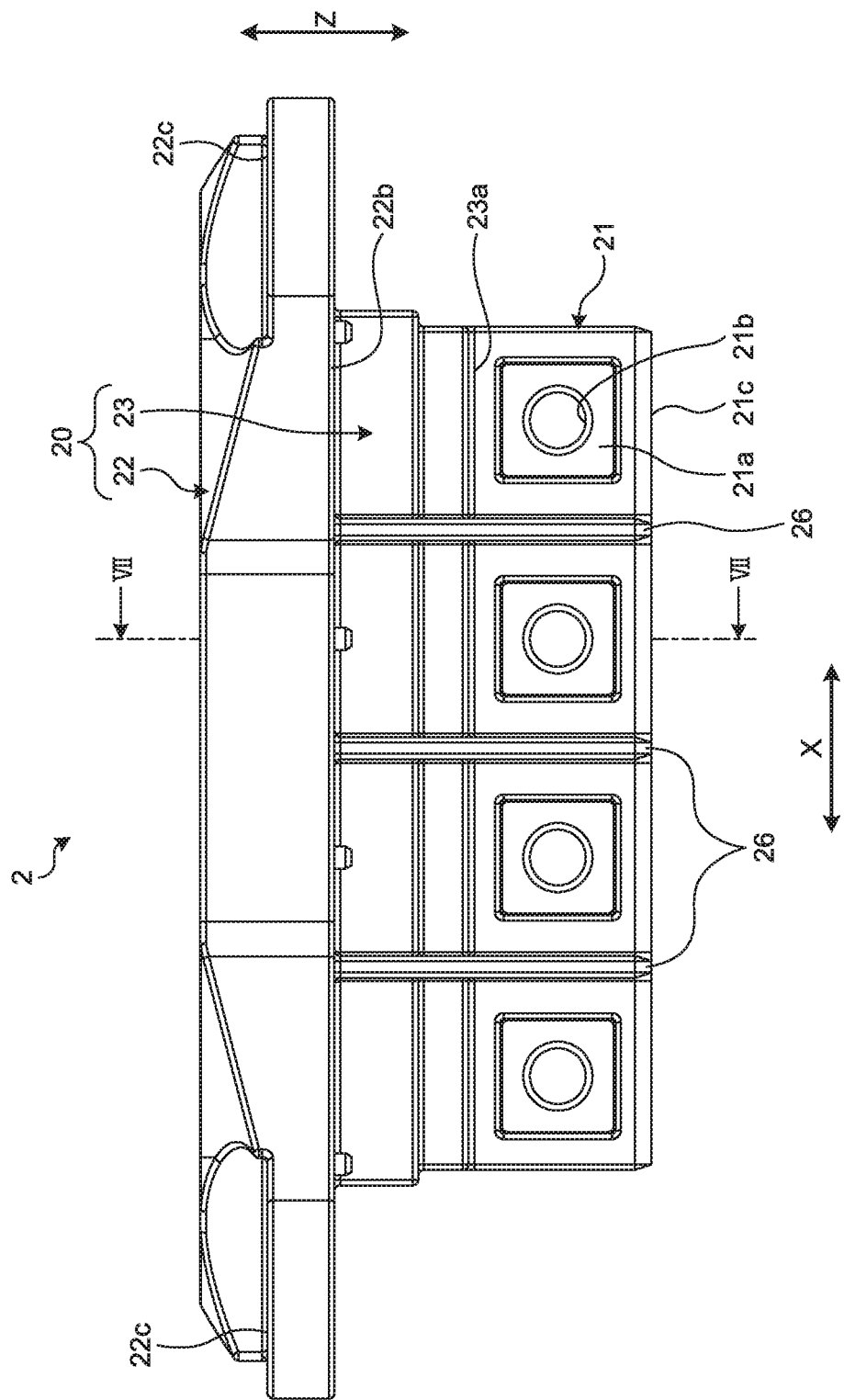
FIG. 4 is a front view of the housing according to the embodiment.
Figure 5:
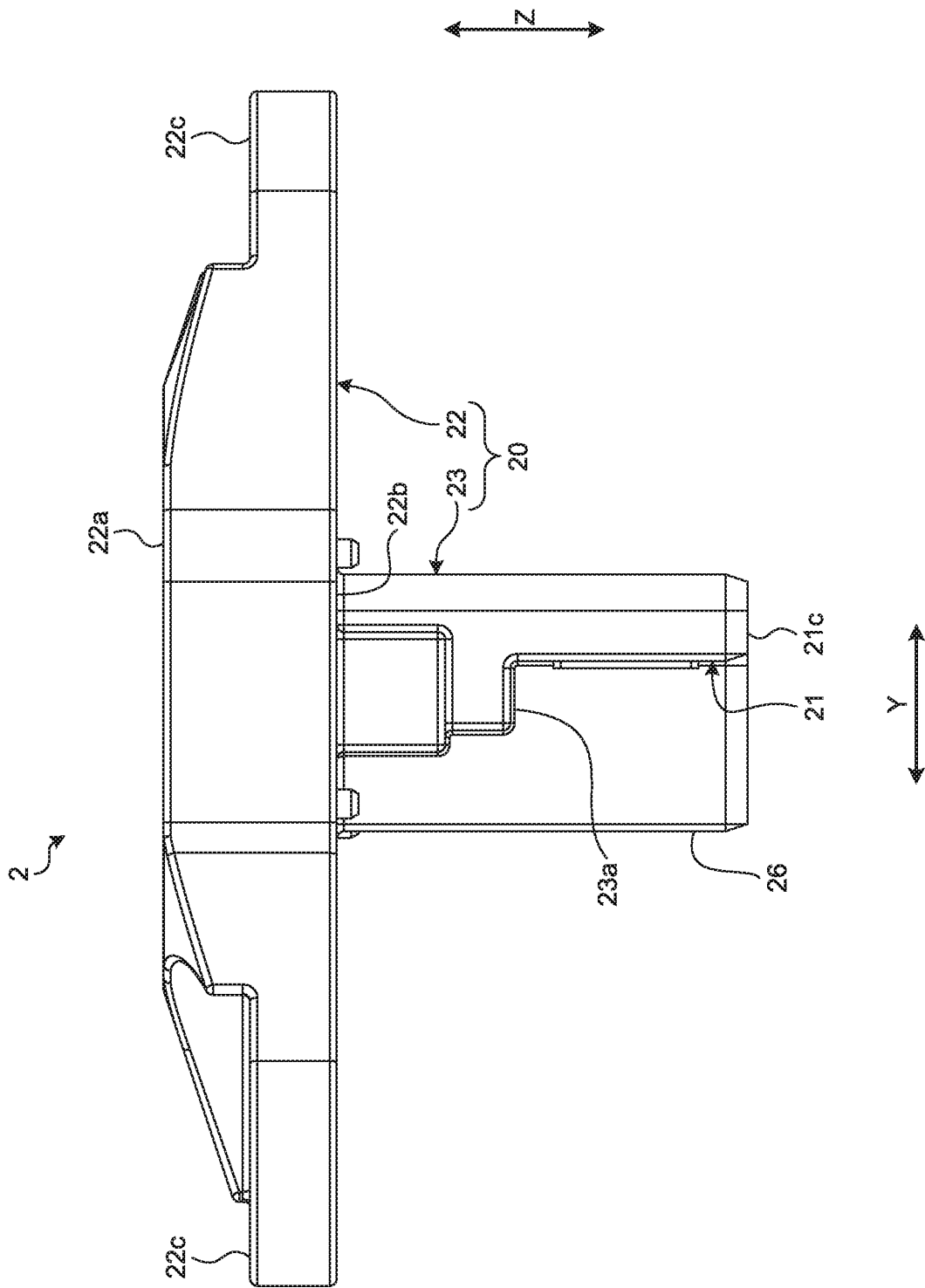
FIG. 5 is a side view of the housing according to the embodiment.
Figure 6:
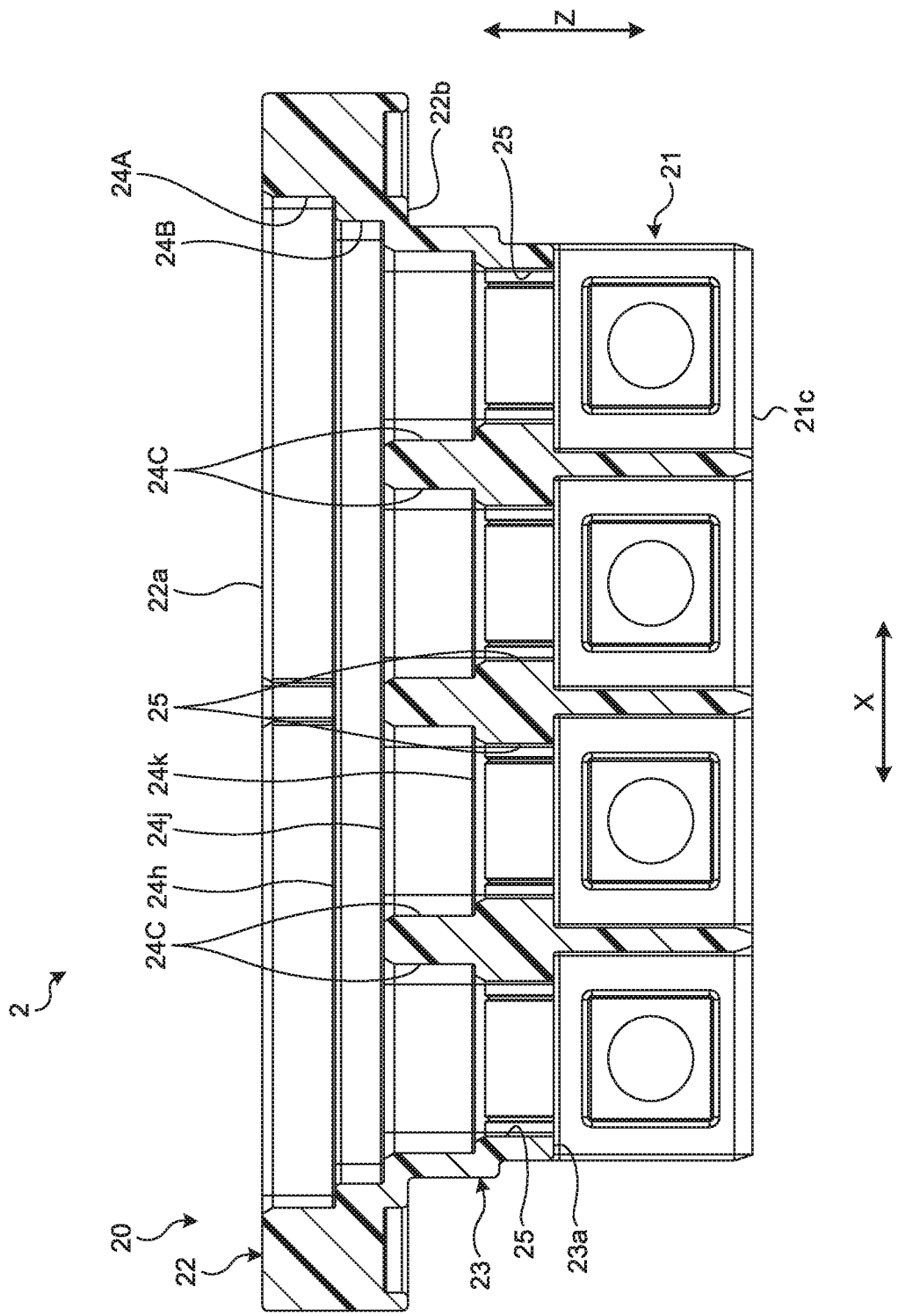
FIG. 6 is a sectional view of the housing according to the embodiment.
Figure 7:
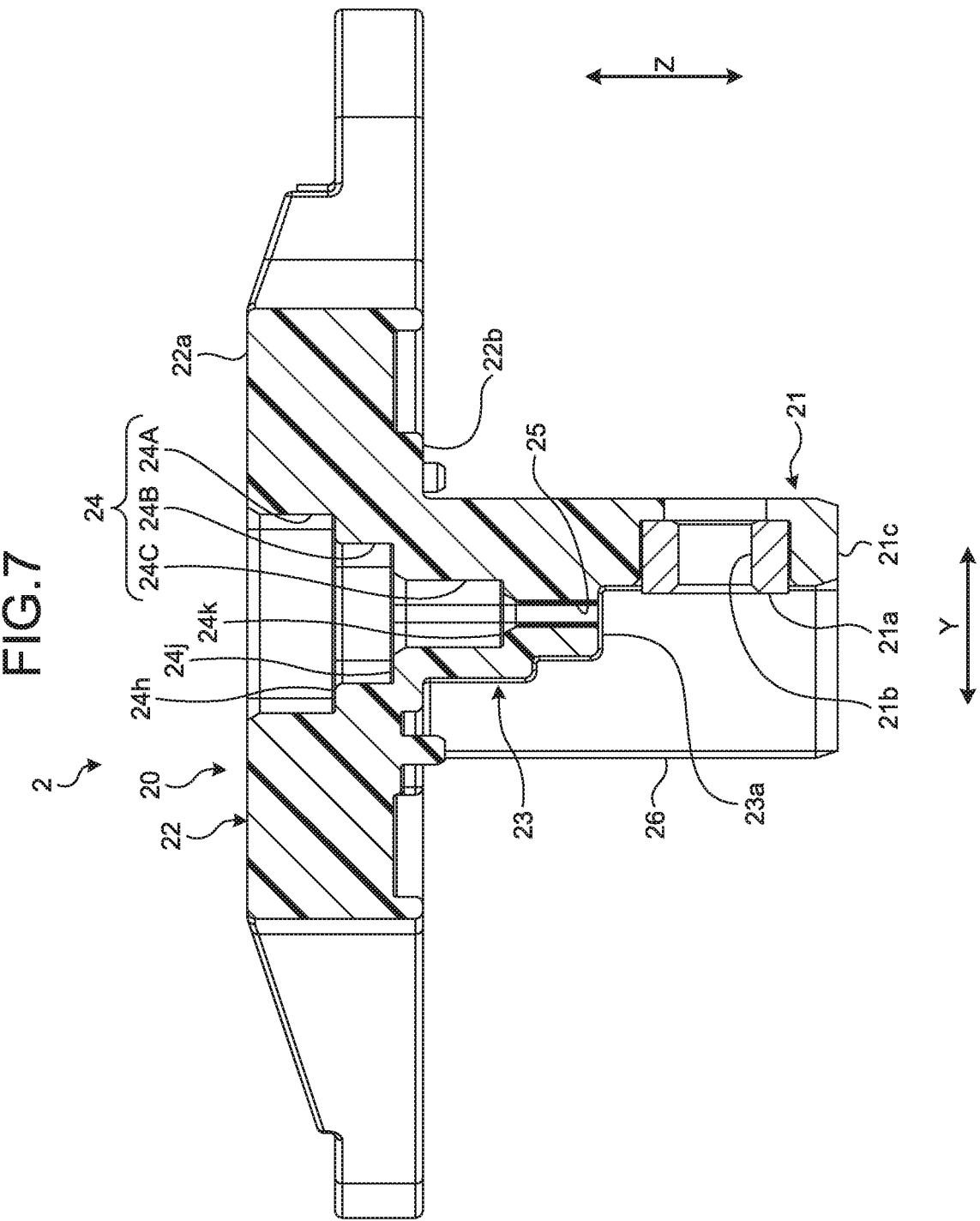
FIG. 7 is another sectional view of the housing according to the embodiment.
Figure 8:
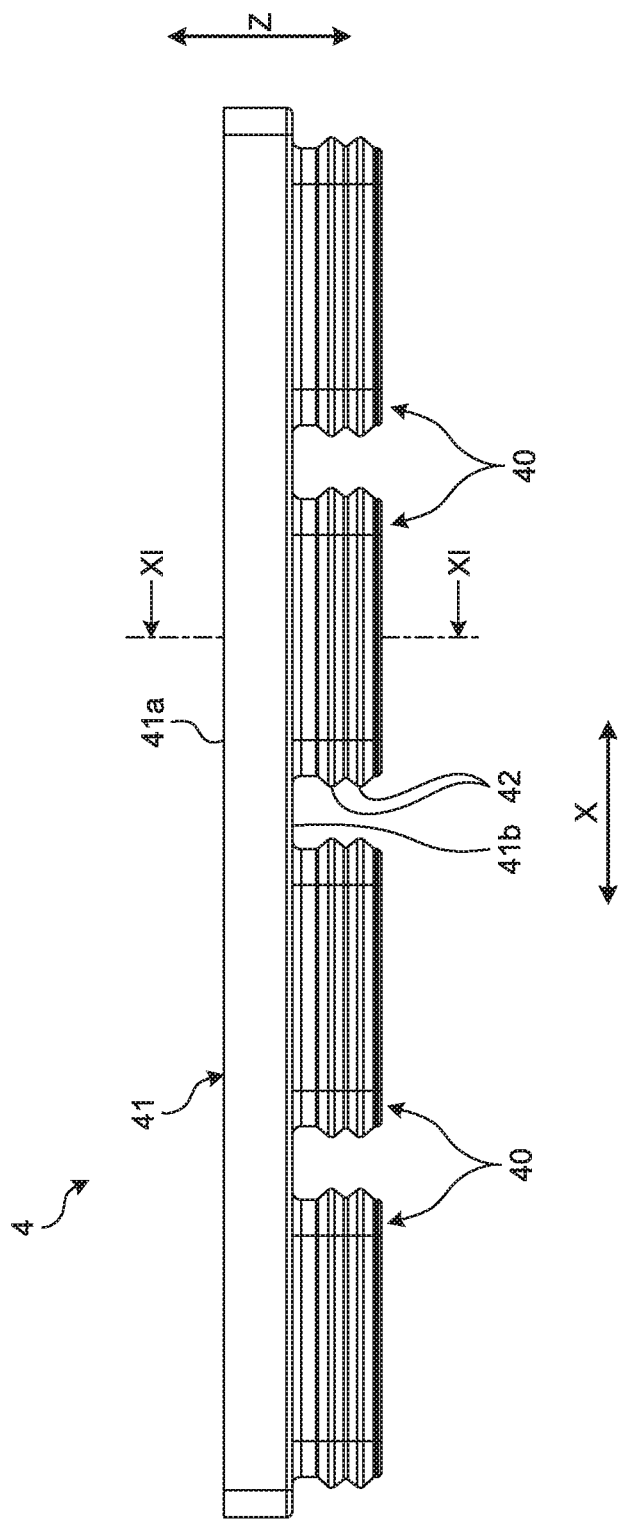
FIG. 8 is a front view of a sealing member according to the embodiment.
Figure 9:
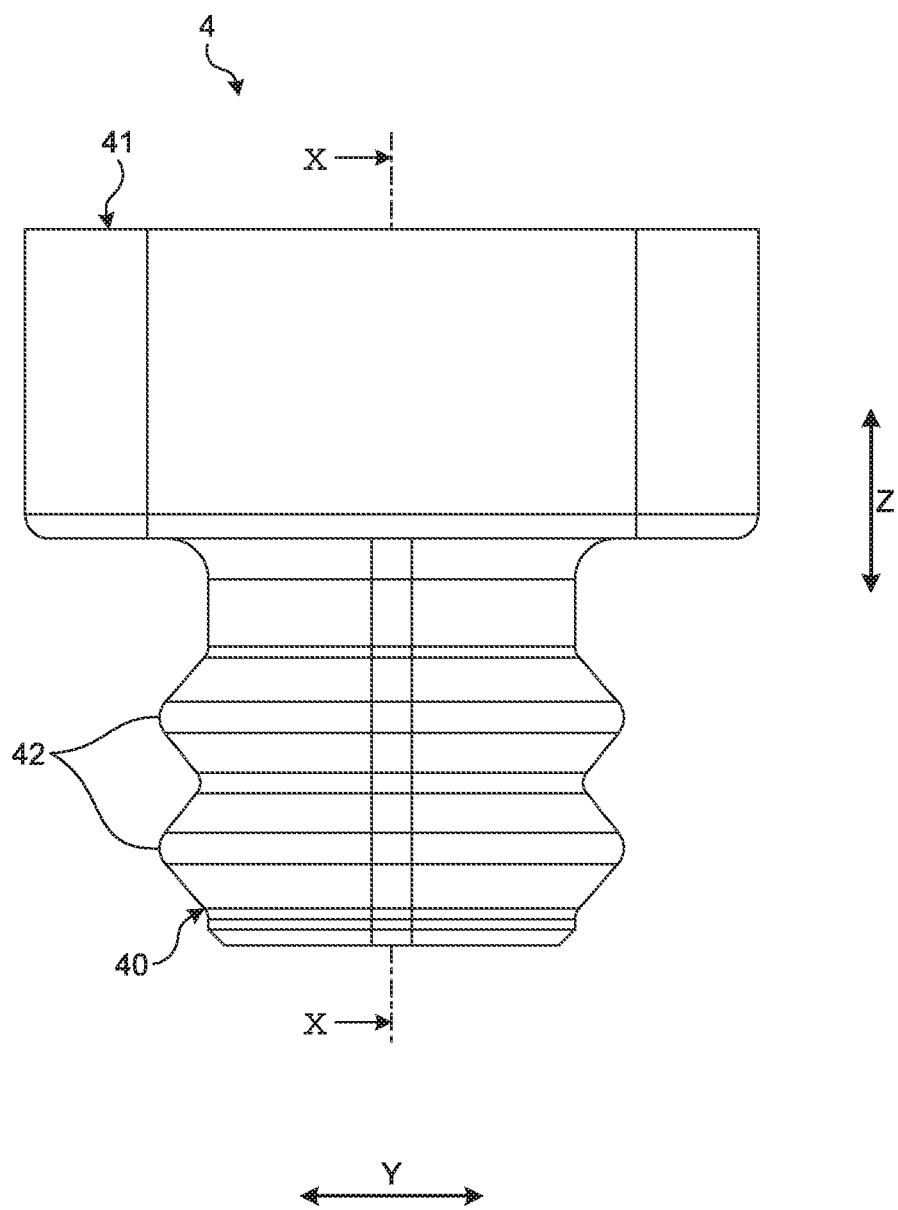
FIG. 9 is a side view of the sealing member according to the embodiment.
Figure 10:
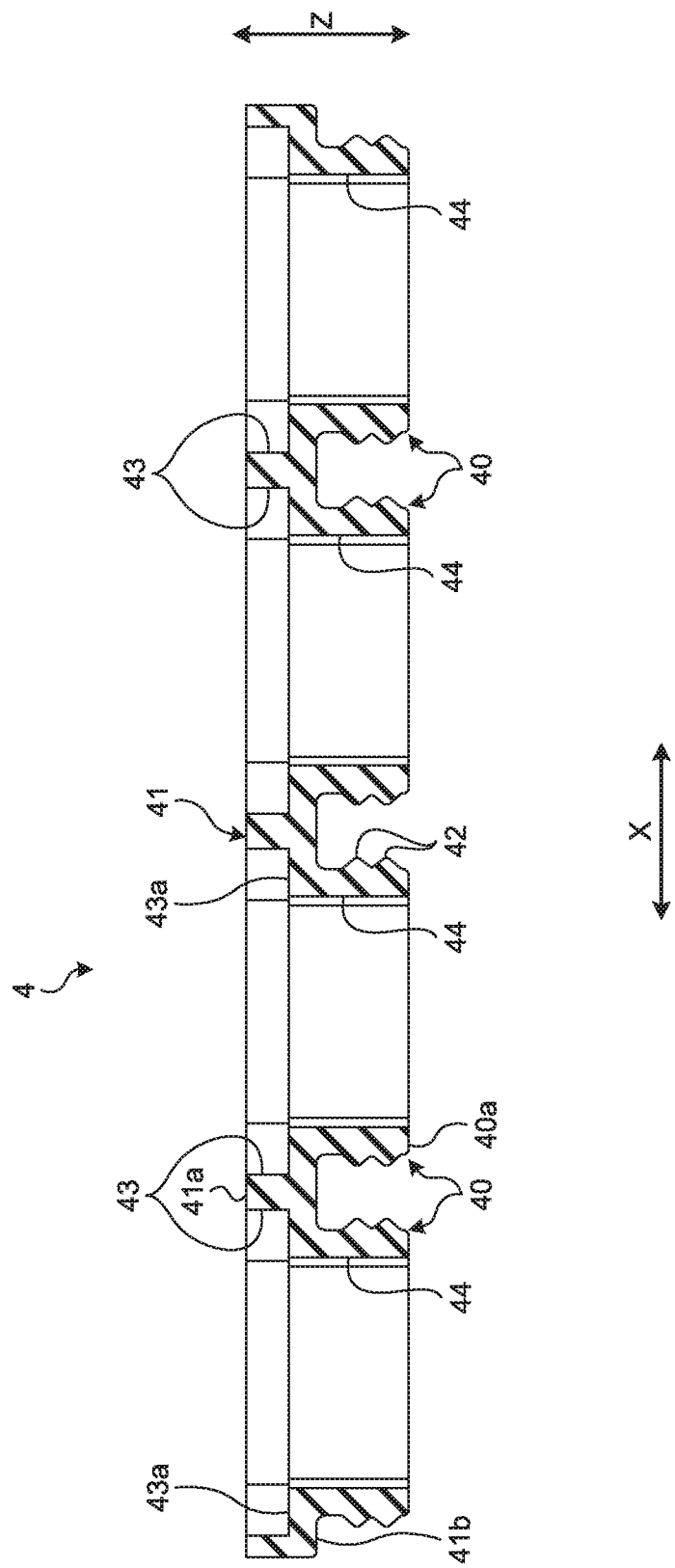
FIG. 10 is a sectional view of the sealing member according to the embodiment.
Figure 11:
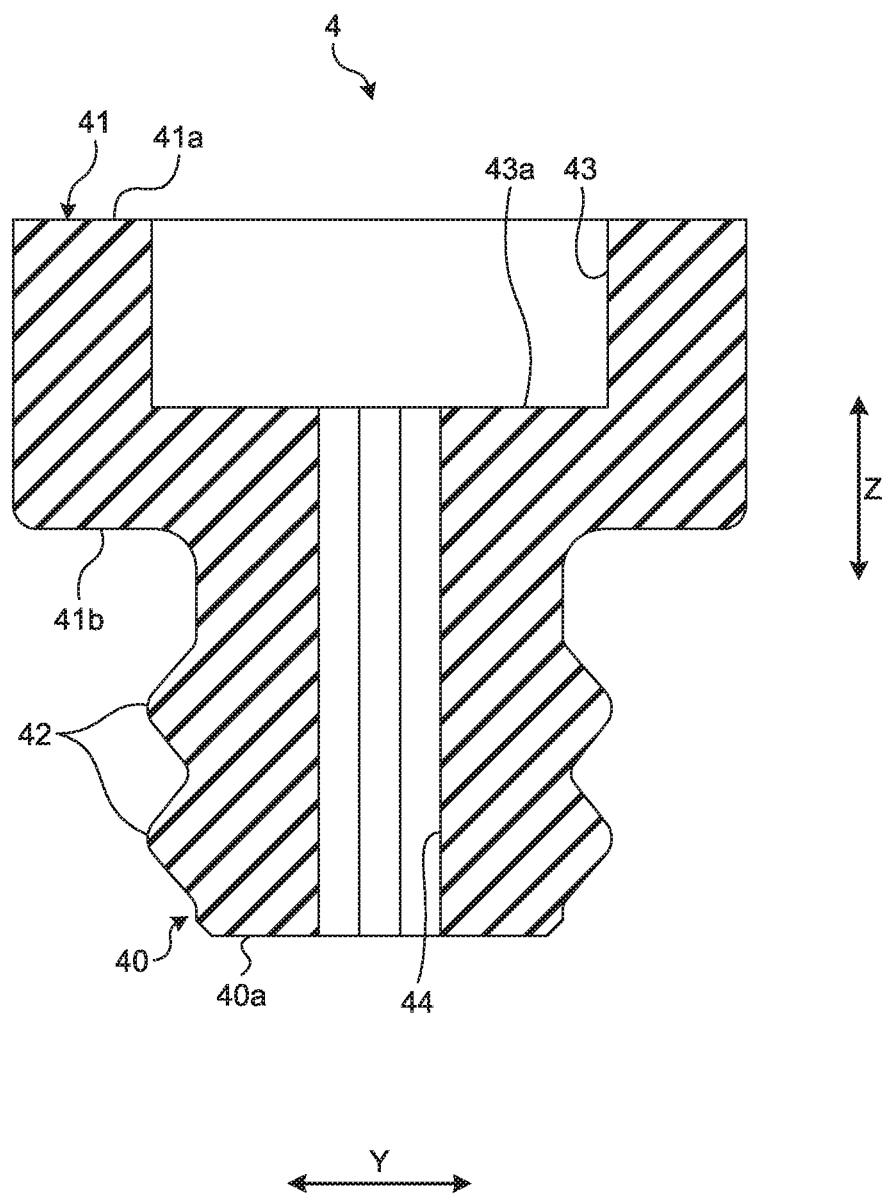
FIG. 11 is another sectional view of the sealing member according to the embodiment.

With reference to FIG. 1 to FIG. 23, an embodiment will be described. The present embodiment relates to a connector. FIG. 1 is a sectional view of a connector, a first device, and a second device according to the embodiment, FIG. 2 is an exploded perspective view of the connector according to the embodiment, FIG. 3 is a plan view of a housing according to the embodiment, FIG. 4 is a front, view of the housing according to the embodiment, FIG. 5 is a side view of the housing according to the embodiment, FIG. 6 is a sectional view of the housing according to the embodiment, FIG. 7 is another sectional view of the housing according to the embodiment, FIG. 8 is a front view of a sealing member according to the embodiment, FIG. 9 is a side view of the sealing member according to the embodiment, FIG. 10 is a sectional view of the sealing member according to the embodiment, and FIG. 11 is another sectional view of the sealing member according to the embodiment.

Figure 12:
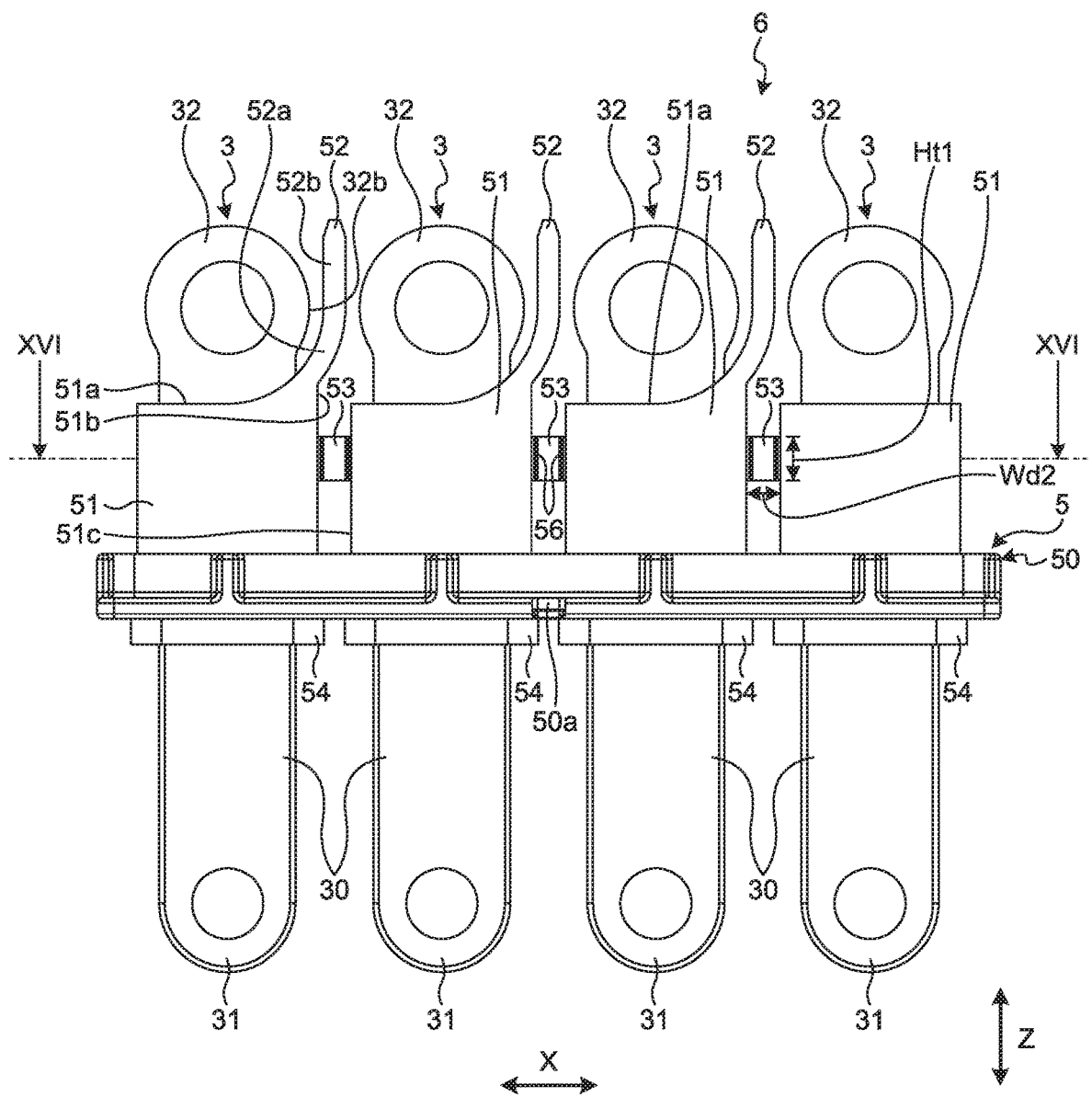
FIG. 12 is a front view of a conductor unit according to the embodiment.
Figure 13:
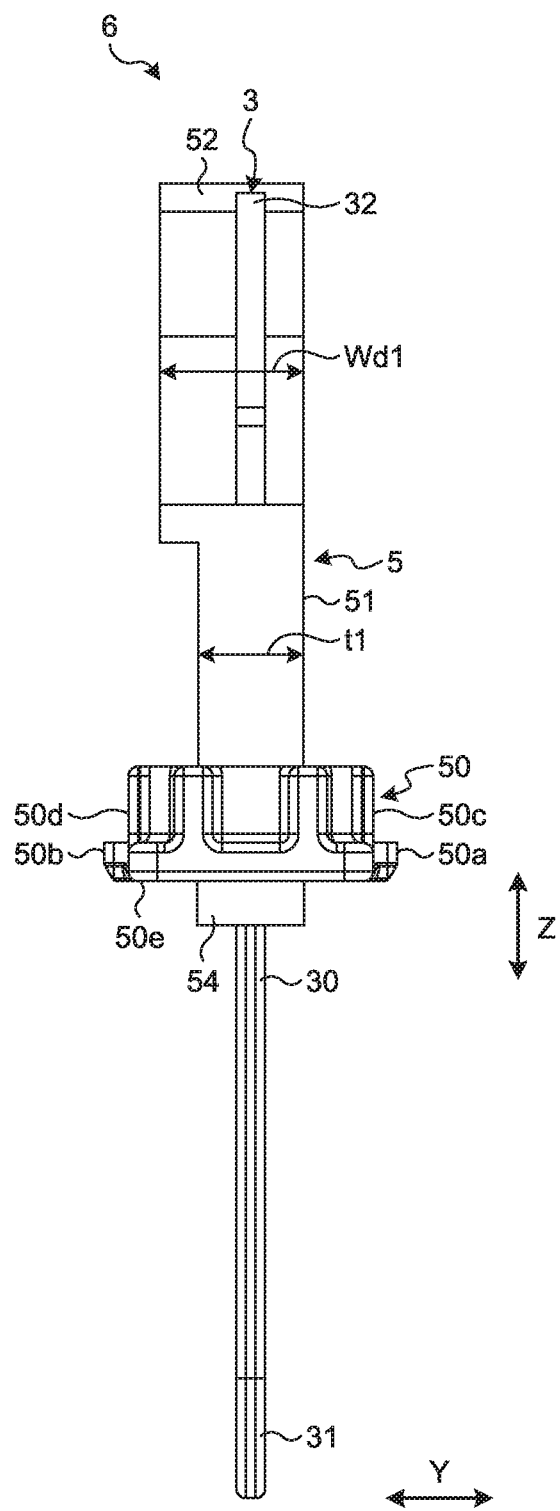
FIG. 13 is a side view of the conductor unit according to the embodiment.
Figure 14:
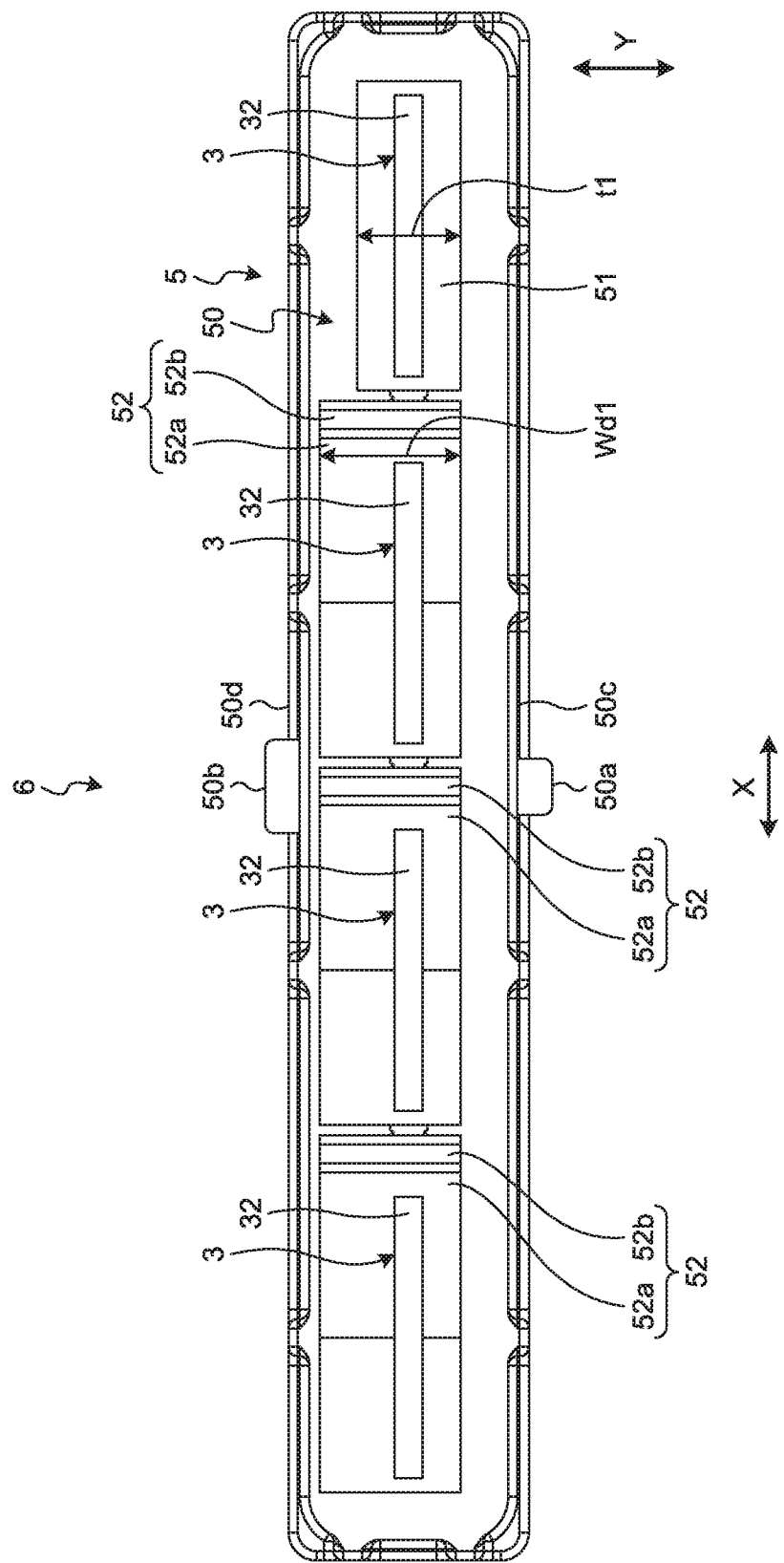
FIG. 14 is a top view of the conductor unit according to the embodiment.
Figure 15:
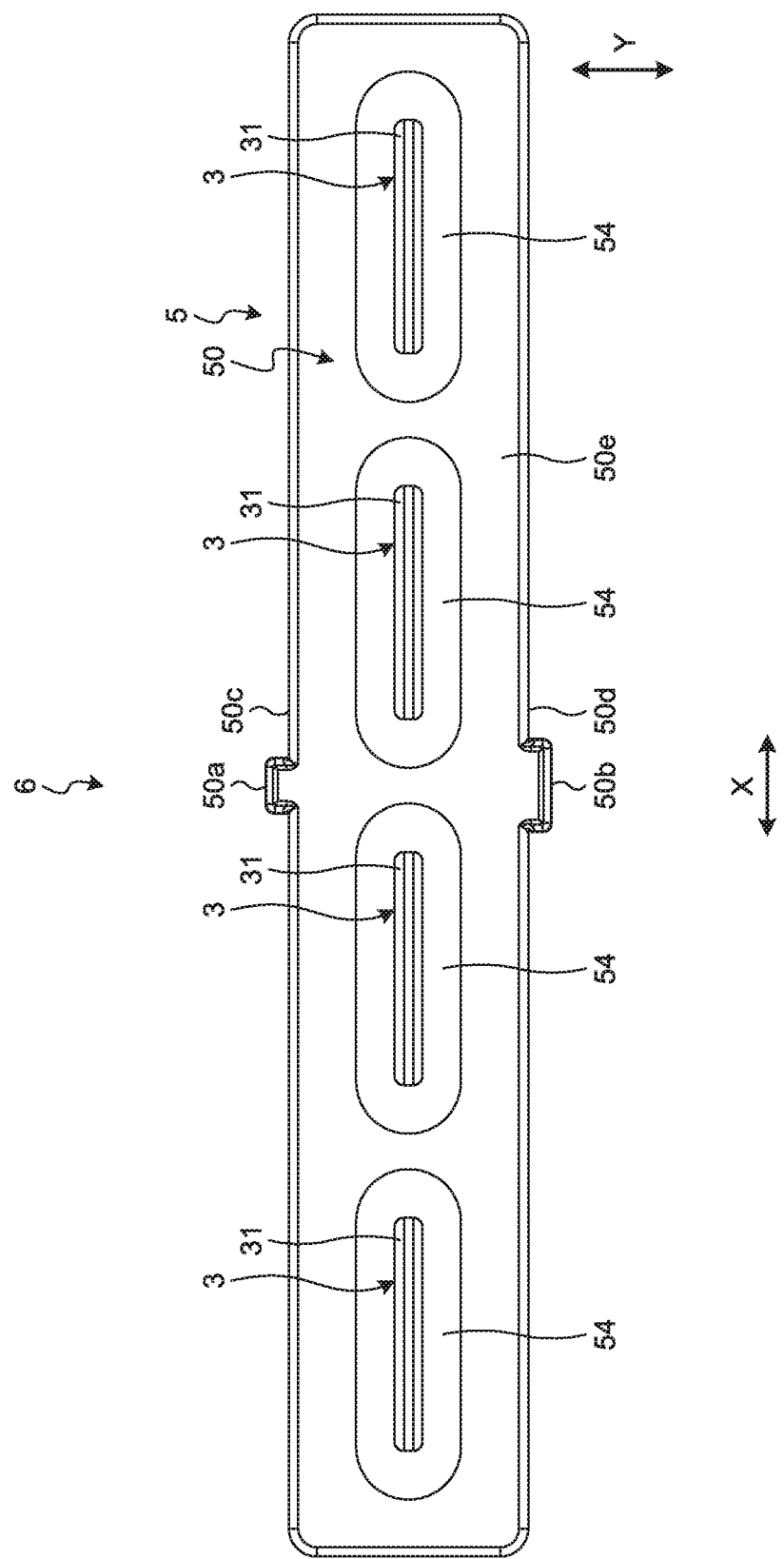
FIG. 15 is a bottom view of the conductor unit according to the embodiment.
Figure 16:
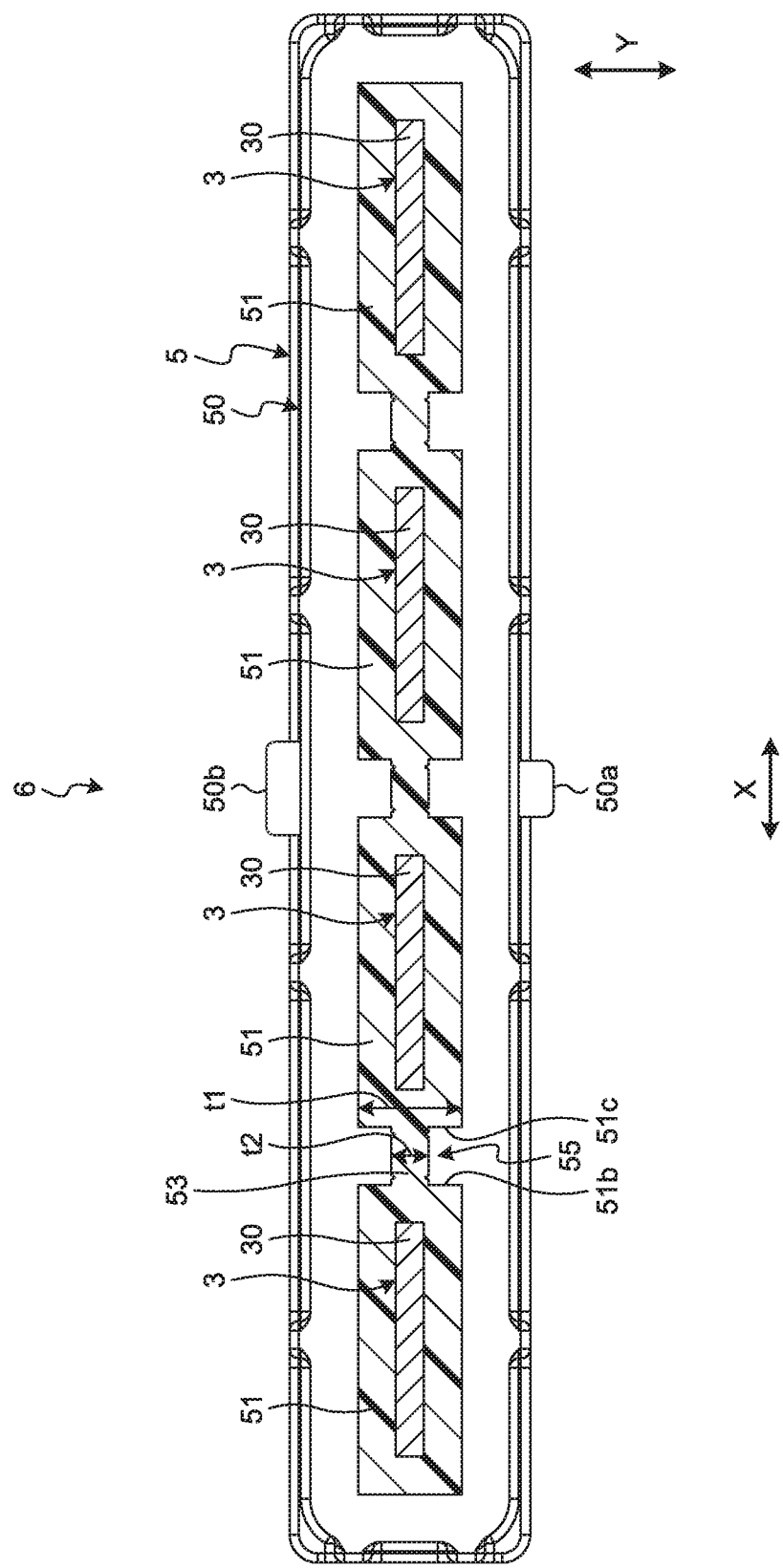
FIG. 16 is a sectional view of the conductor unit according to the embodiment.
Figure 17:
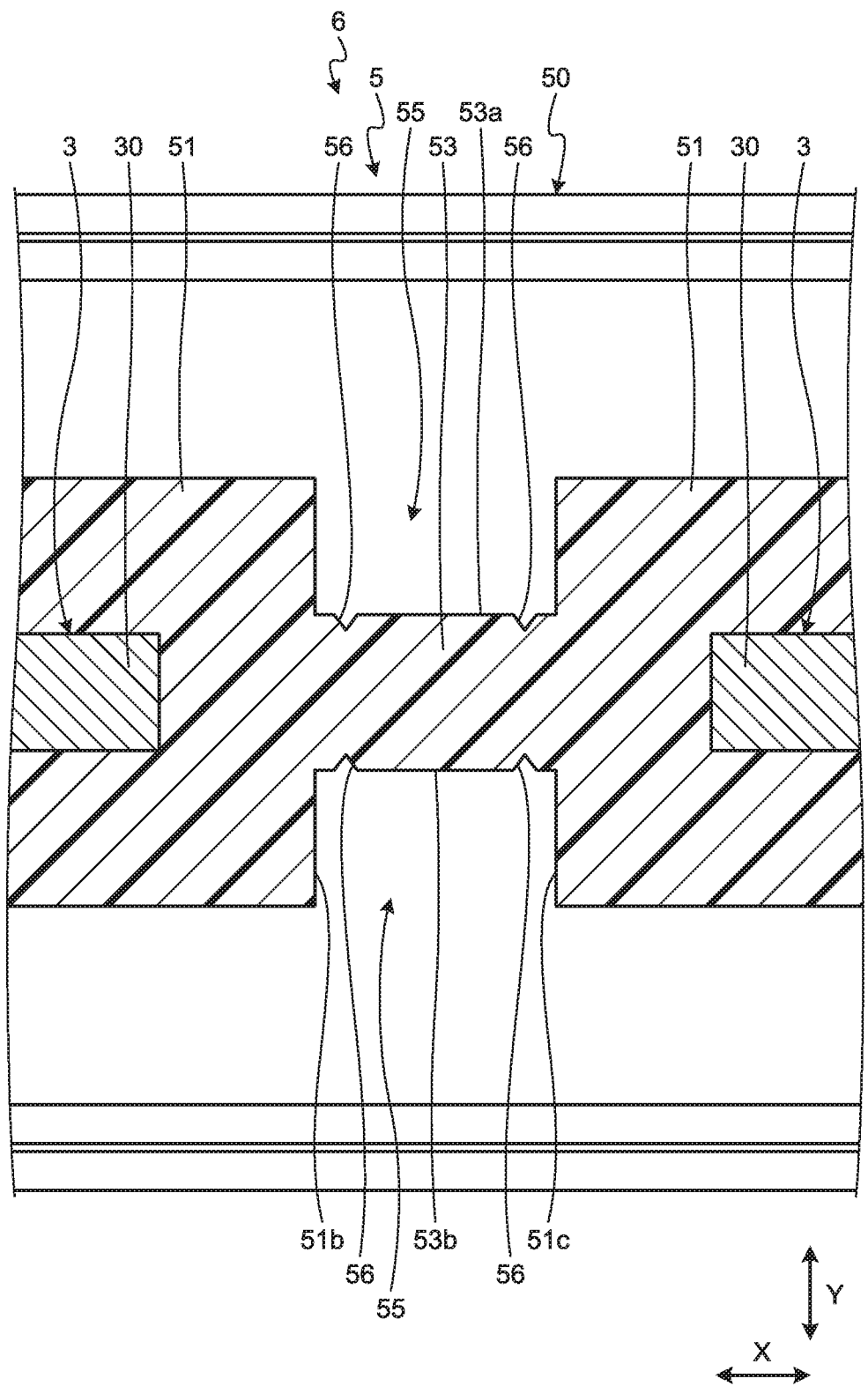
FIG. 17 is an enlarged sectional view of the conductor unit according to the embodiment.
Figure 18:
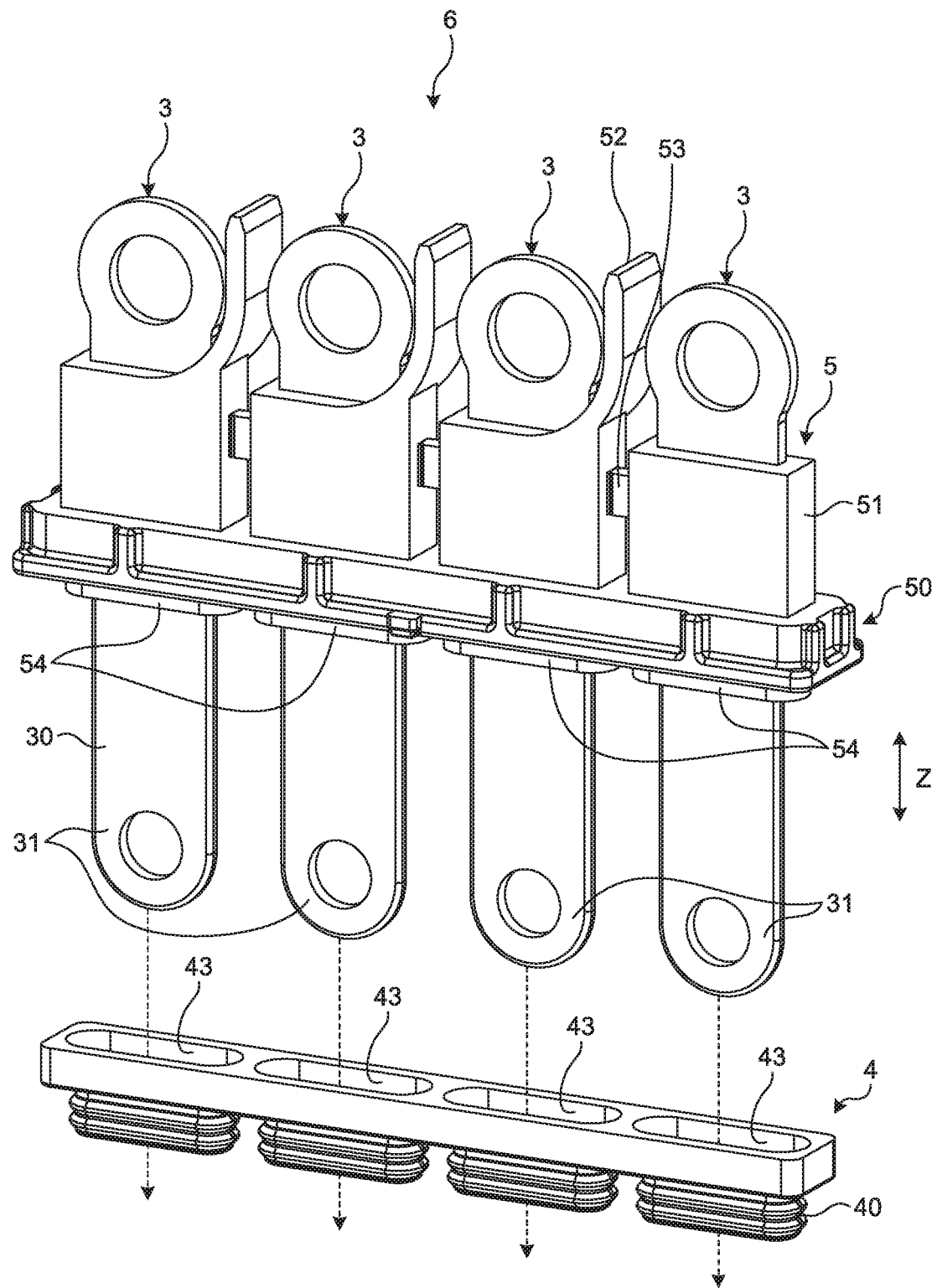
FIG. 18 is a perspective view illustrating attachment of the sealing member with respect to the conductor unit.
Figure 19:
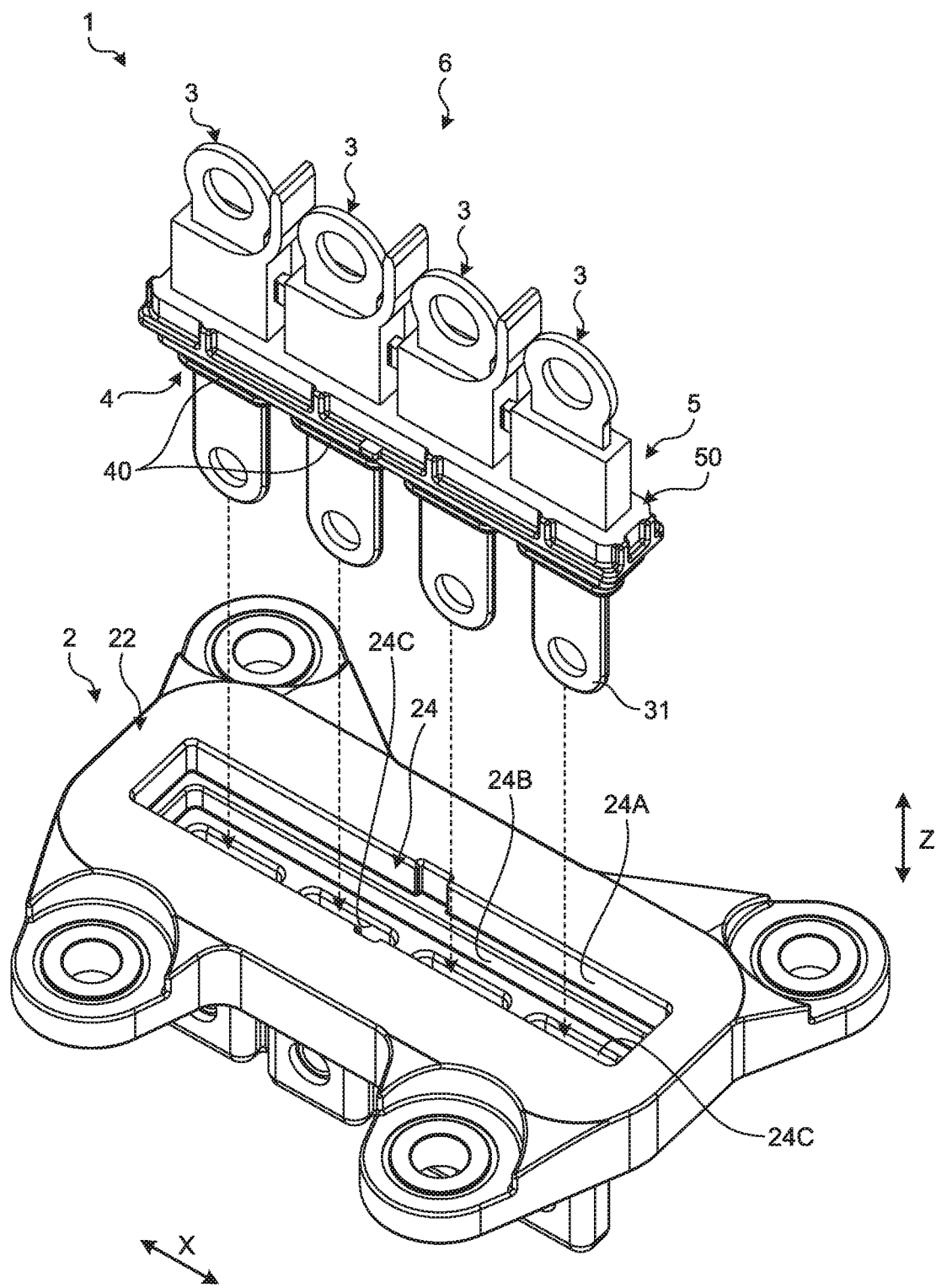
FIG. 19 is a perspective view for explaining assembly of the conductor unit with respect to the housing.
Figure 20:
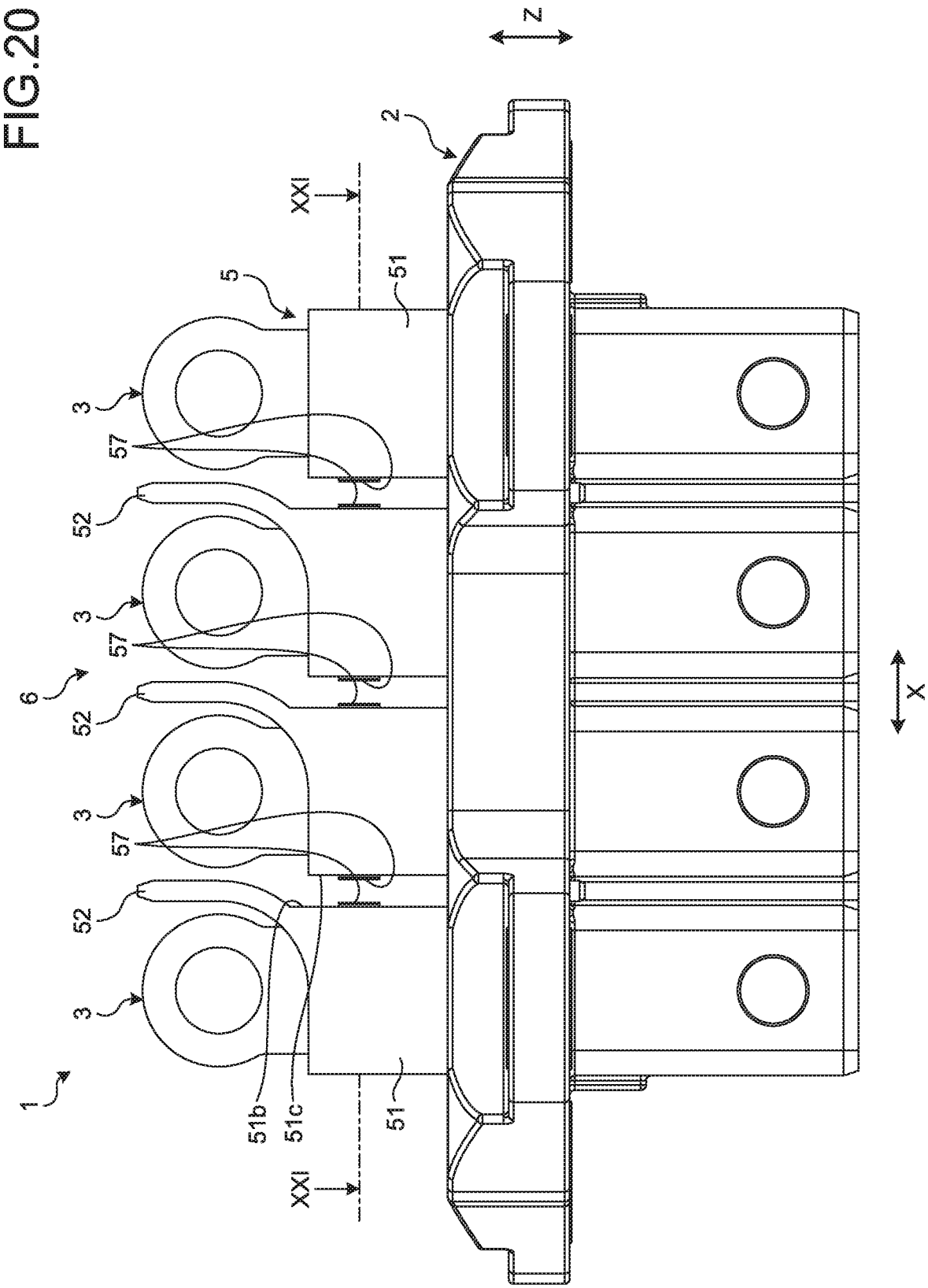
FIG. 20 is a front view illustrating the connector after connecting parts are cut.
Figure 21:
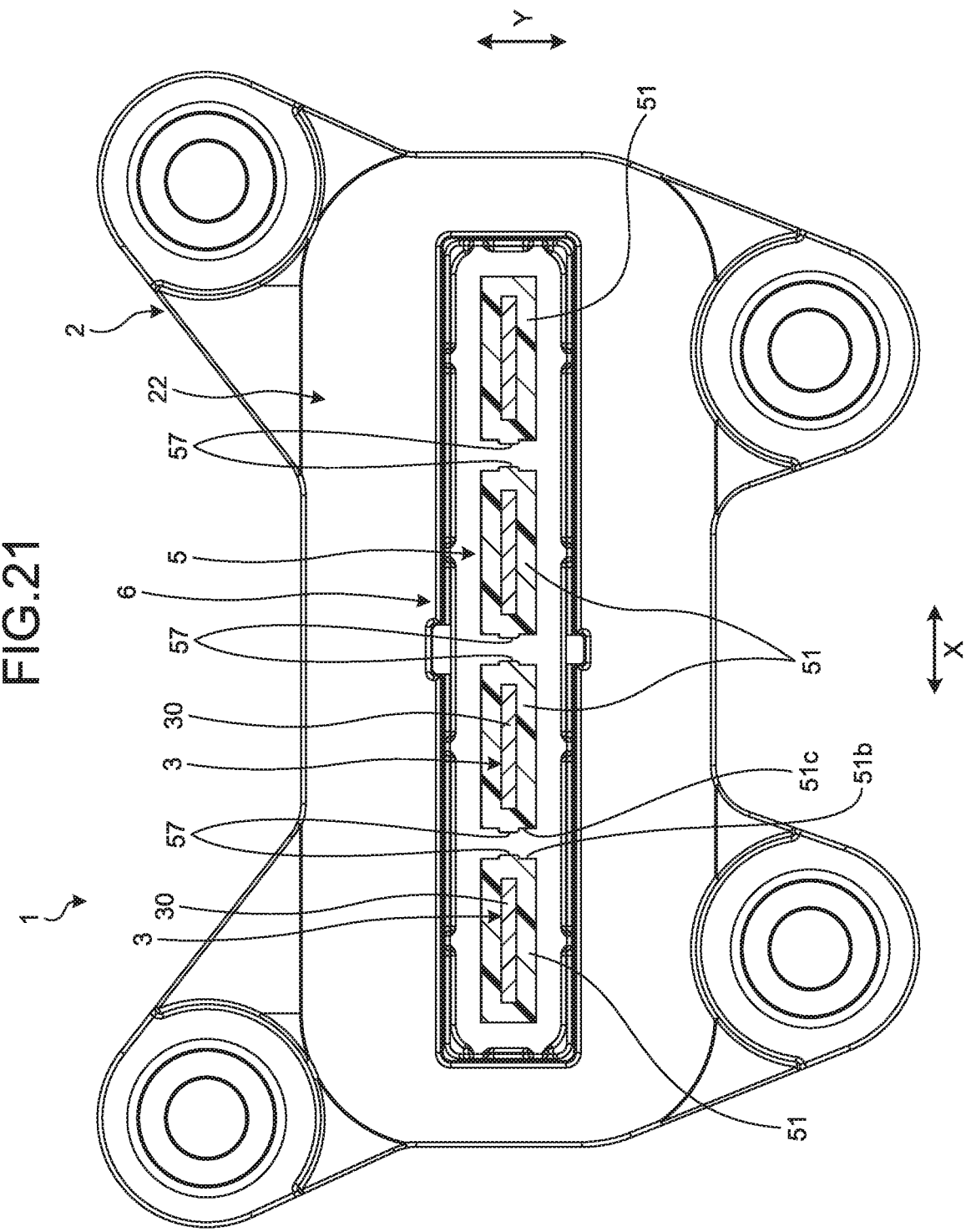
FIG. 21 is a sectional view illustrating the connector after the connecting parts are cut.
Figure 22:
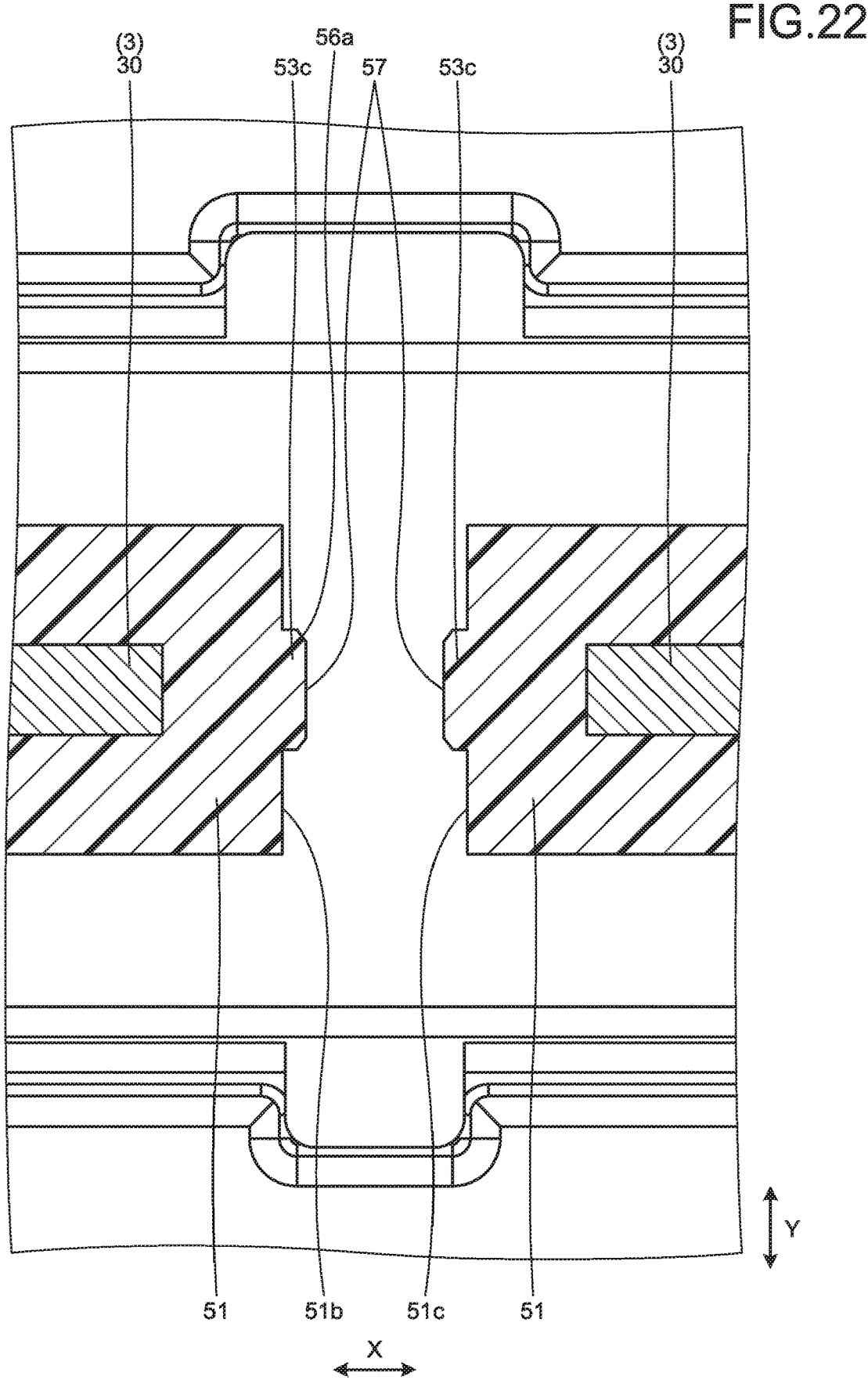
FIG. 22 is an enlarged sectional view illustrating the connector after the connecting parts are cut.

FIG. 12 is a front view of a conductor unit according to the embodiment, FIG. 13 is a side view of the conductor unit according to the embodiment, FIG. 14 is a top view of the conductor unit according to the embodiment, FIG. 15 is a bottom view of the conductor unit according to the embodiment, FIG. 16 is a sectional view of the conductor-unit according to the embodiment, FIG. 17 is an enlarged sectional view of the conductor unit according to the embodiment, FIG. 18 is a perspective view illustrating attachment of the sealing member with respect to the conductor unit. FIG. 19 is a perspective view for explaining assembly of the conductor unit with respect to the housing. FIG. 20 is a front view illustrating the connector after connecting parts are cut, FIG. 21 is a sectional view illustrating the connector after the connecting parts are cut, FIG. 22 is an enlarged sectional view illustrating the connector after the connecting parts are cut, and FIG. 23 is a plan view illustrating the connector attached to the first device.

Figure 23:
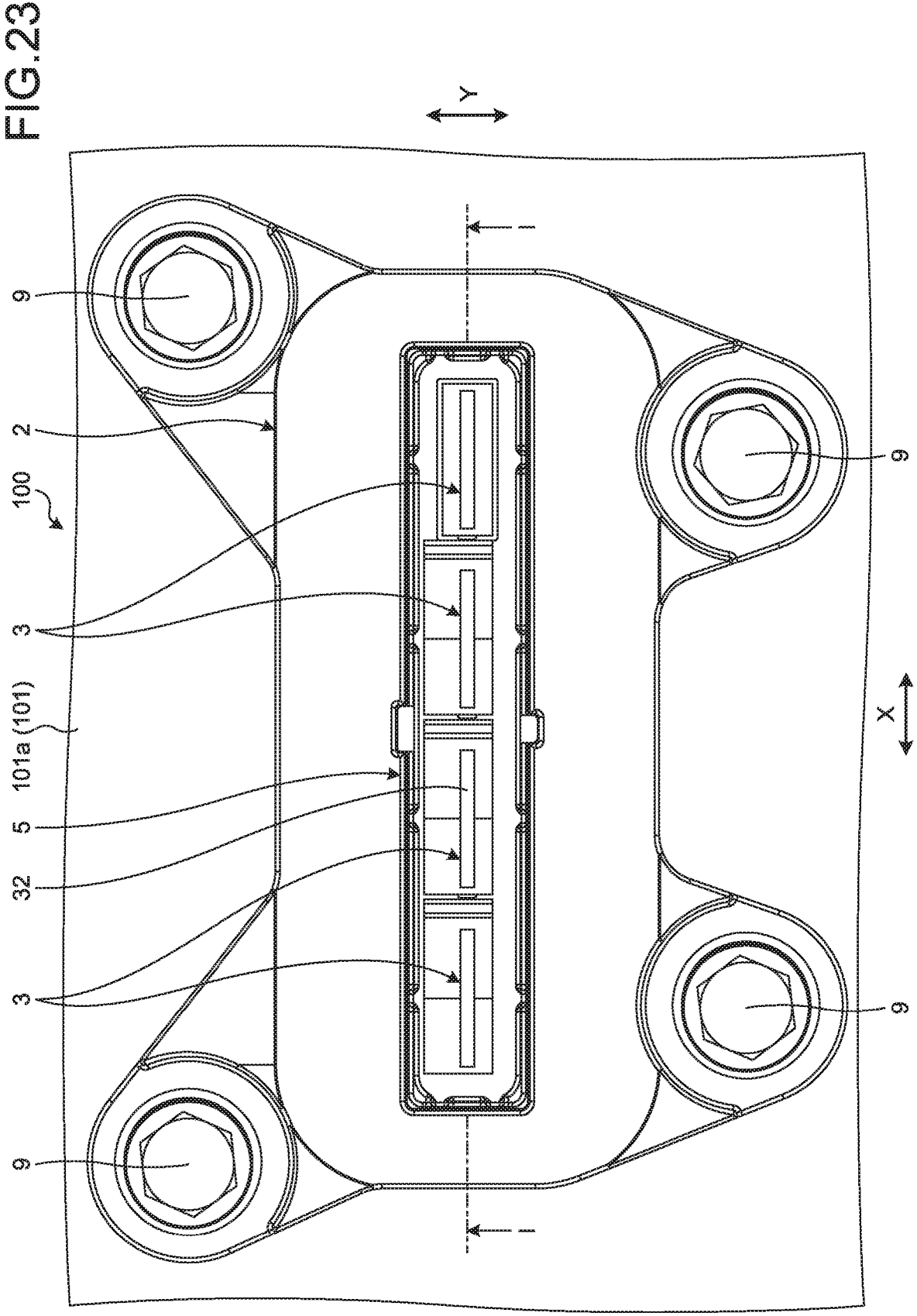
FIG. 23 is a plan view illustrating the connector attached to the first device.

FIG. 1 illustrates a section taken along line I-I of FIG. 23. FIG. 6 illustrates a section taken along line VI-VI of FIG. 3 FIG. 7 illustrates a section taken along line VII-VII of FIG. 4. FIG. 10 illustrates a section taken along line X-X of FIG. 9. FIG. 11 illustrates a section taken along line XI-XI of FIG. 8. FIG. 16 illustrates a section taken along line XVI-XVI of FIG. 12. FIG. 21 illustrates a section taken along line XXI-XXI of FIG. 20.

Figure 2:
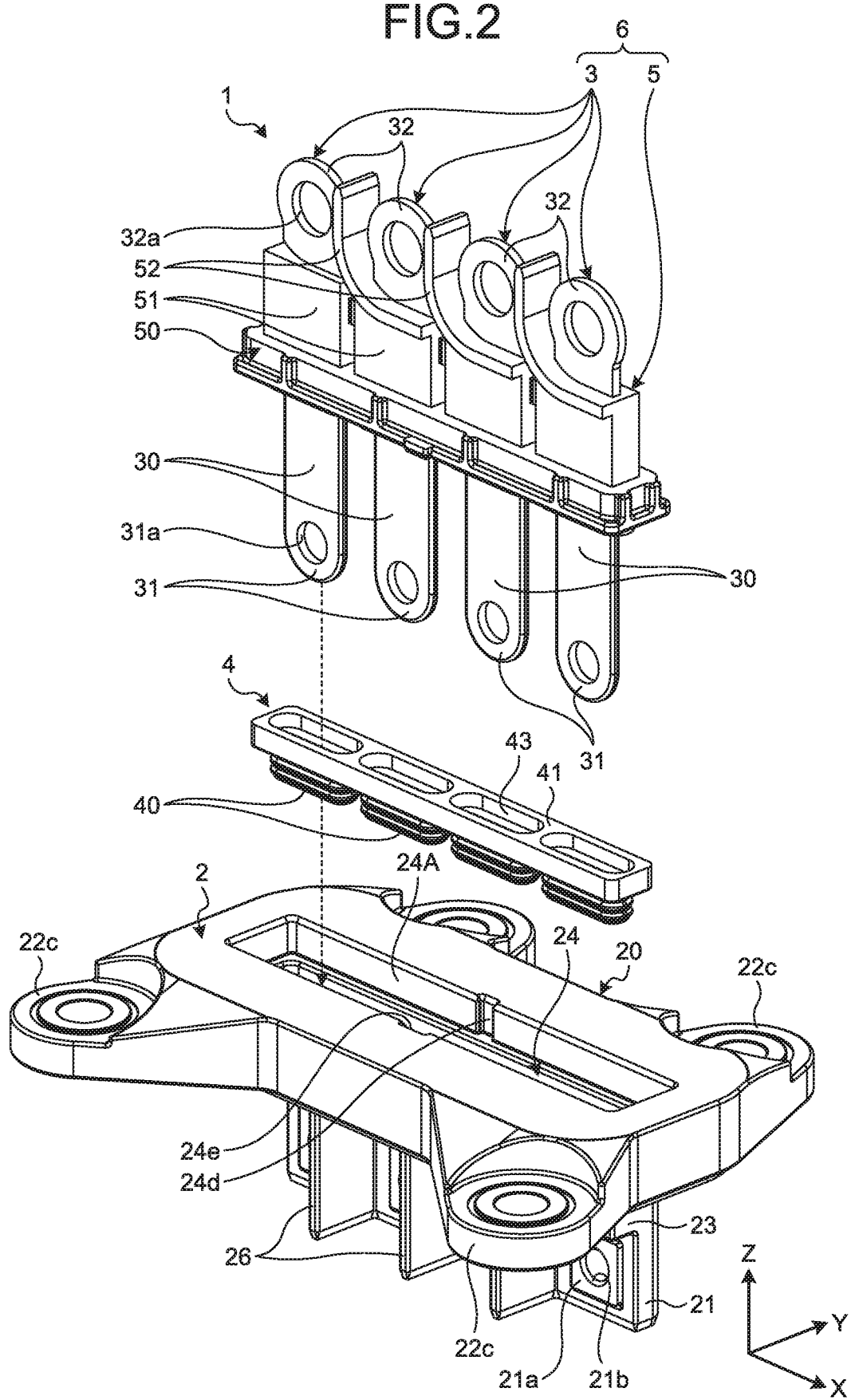
FIG. 2 is an exploded perspective view of the connector according to the embodiment.

As illustrated in FIG. 1 and FIG. 2, a connector 1 according to the embodiment has a housing 2, a conductor unit 6, and a sealing member 4. The connector 1 electrically connects a first device 100 and a second device 200. In the present embodiment, the first device 100 is a motor and the second device 200 is an inverter. The first device 100 and the second device 200 are mounted on a vehicle such as an automobile, for example. A motor body 103 of the first device 100 and an inverter body 203 of the second device 200 are electrically connected via a plurality of conductors 3.

The second device 200 is interposed between a battery mounted on the vehicle and the first device 100. The second device 200 has a conversion function between a direct current and an alternating current and a transformation function of stepping up and down a voltage. The supply of electric power from the battery to the first device 100 is controlled by the second device 200. Furthermore, electric power generated by regeneration in the first device 100 is stored in the battery via the second device 200.

The first device 100 has a casing 101 and the motor body 103. The motor body 103 is a main component of the first device 100 and includes a rotor and a stator. The motor body 103 is disposed in an internal space 102 of the casing 101. In the internal space 102 of the casing 101, a first liquid 104 is stored. The first liquid 104 is a liquid having a lubricating function and a cooling function for the motor body 103, and is, for example, oil. An upper wall part 101a of the casing 101 has an opening 101b. The opening 101b penetrates the wall part 101a and allows the internal space 102 of the casing 101 and an external space of the casing 101 to communicate with each other.

The second device 200 has a casing 201 and the inverter body 203. The inverter body 203 is a main component of the second device 200 and includes a switching circuit. The inverter body 203 is disposed in an internal space 202 of the casing 201. A pipe 204 is provided in the internal space 202 of the casing 201. A second liquid 205 for cooling is supplied to the inverter body 203 via the pipe 204. The second liquid 205 is, for example, coolant. A lower wall part 201a of the casing 201 has an opening 201b.

The casing 101 and the casing 201 are fixed to each other with the opening 101b and the opening 201b facing each other. A gasket 300 is interposed between the wall part 101a of the casing 101 and the wall part 201a of the casing 201.

The connector 1 is fixed to the casing 101 of the first device 100 at a communication part 10 through which the opening 101b of the first device 100 and the opening 201b of the second device 200 communicate with each other. The communication part 10 is a part where the opening 101b of the first device 100 and the opening 201b of the second device 200 face each other. In the present embodiment, the opening 201b of the second device 200 is larger than the opening 101b of the first device 100. Accordingly, the wall part 101a of the first device 100 is exposed toward the internal space 202 of the second device 200.

As illustrated in FIG. 1 and FIG. 2, the conductor unit 6 of the present embodiment has the conductors 3 and an insulating holding body 5. The illustrated conductor 3 is a bus bar and is made of a conductive metal, for example, copper, aluminum, and the like. The conductor 3 is formed, for example, by being punched out from a metal plate as a base material. The number of the conductors 3 included in the conductor unit 6 of the present embodiment is four. However, the number of the conductors 3 is not limited to four. The conductor 3 has a body 30, a first terminal part 31, and a second terminal part 32. The body 30 has a rectangular plate shape.

The first terminal part 31 is connected to one end of the body 30 in a longitudinal direction. The first terminal part 31 is electrically connected to a terminal included in the first device 100. The first terminal part 31 has a circular shape, for example. The outer diameter of the first terminal part 31 is equal to the width of the body 30. The first terminal part 31 has a through-hole 31a into which a fastening member is inserted. The second terminal part 32 is connected to the other end of the body 30 in the longitudinal direction. The second terminal part 32 is electrically connected to a terminal included in the second device 200. The second terminal part 32 has a circular shape, for example. The second terminal part 32 has a through-hole 32a into which a fastening member is inserted. The outer diameter of the second terminal part 32 is larger than that of the first terminal part 31. Furthermore, the outer diameter of the second terminal part 32 is larger than the width of the body 30.

The conductors 3 are arranged in a row. More specifically, the conductors 3 are arranged on the same plane along the width direction of the body 30. In the present embodiment, the longitudinal direction of the conductor 3 is referred to as a "height direction Z". Furthermore, a direction in which the conductors 3 are arranged is referred to as a "first direction X". The first direction X is orthogonal to the height direction Z. A direction orthogonal to both the first direction X and the height direction Z is referred to as a "second direction Y". The second direction Y is a plate thickness direction of the conductor 3. The conductors 3 are arranged, for example, such that the first terminal part 31 is arranged on a straight line and the second terminal part 32 is arranged on a straight line.

The holding body 5 is integrally molded with the conductors 3. The holding body 5 is, for example, an insulating synthetic resin and is integrally formed with the conductors 3 by insert molding. The holding body 5 has a fitting part 50 fitted to the housing 2, a plurality of covering parts 51, and a plurality of insulating walls 52. A detailed structure of the holding body 5 will be described below.

As illustrated in FIG. 2, the housing 2 has a body 20 and a wall part 21. The body 20 and the wall part 21 are integrally molded by an insulating synthetic resin, for example. The material of the housing 2 is resistant to the first liquid 104. The material of the housing 2 is, for example, an oil-resistant synthetic resin. The body 20 is a part fixed to the wall part 101a of the first device 100. The body 20 has a base 22 formed in a plate shape and a protruding part 23 protruding toward the height direction Z from the base 22. The wall part 21 protrudes toward the height direction Z from a tip end of the protruding part 23.

As illustrated in FIG. 3, the base 22 has a substantially planar rectangular shape. The longitudinal direction of the base 22 is the first direction X. The base 22 is provided at the four corners thereof with fixed parts 22c each having a through-hole. The fixed parts 22c are fixed to the wall part 101a of the first device 100 by, for example, bolts 9 (see FIG. 23). As illustrated in FIG. 5 and the like, the base 22 has a first surface 22a and a second surface 22b. The second surface 22b is a surface on which the protruding part 23 is provided. The first surface 22a is a surface opposite to the second surface 22b. The base 22 is fixed with the first surface 22a facing the second device 200 and with the second surface 22b facing the wall part 101a. The first surface 22a faces upward when the first device 100 and the second device 200 are installed in a vehicle, for example.

As illustrated in FIG. 4 and FIG. 5, the protruding part 23 protrudes toward the height direction Z from the second surface 22b of the base 22. The protruding part 23 has a substantially rectangular parallelepiped shape. The protruding part 23 in a section orthogonal to the height direction Z has a substantially sectional rectangular shape. In the sectional shape of the protruding part 23, the longitudinal direction is the first direction X.

As illustrated in FIG. 2 and FIG. 3, the body 20 has a recess 24 formed in multiple stages. The recess 24 is opened to the first surface 22a of the base 22 and is recessed toward the wall part 21 along the height direction Z. The recess 24 has a first recess 24A, a second recess 24B, and third recesses 24C. The first recess 24A is fitted to the holding body 5 and supports the holding body 5 from below. The second recess 24B and the third recesses 24C are fitted to the sealing member 4 and supports the sealing member 4 from below.

As illustrated in FIG. 3, the first recess 24A has a substantially planar rectangular shape. The longitudinal direction of the first recess 24A is the first direction X. The first recess 24A has a first wall surface 24f and a second wall surface 24g facing each other in the second direction Y. The first wall surface 24f and the second wall surface 24g are surfaces along the first direction X and the height direction Z.

The first recess 24A has a first groove 24d and a second groove 24e. The first groove 24d and the second groove 24e restrict the direction when the holding body 5 is attached to the housing 2, and prevent erroneous assembly. The first groove 24d and the second groove 24e extend along the height direction Z. The first groove 24d is provided on the first wall surface 24f. The second groove 24e is provided on the second wall surface 24g. The first groove 24d and the second groove 24e face each other in the second direction Y. The groove width of the first groove 24d is smaller than that of the second groove 24e.

The second recess 24B is recessed along the height direction Z from a bottom surface 24h of the first recess 24A toward the wall part 21 side. The second recess 24B has a substantially planar rectangular shape. The longitudinal direction of the second recess 24B is the first direction X. The third recesses 24C are recessed along the height direction Z from a bottom surface 24j of the second recess 24B toward the wall part 21 side. The recess 24 of the present embodiment, has a plurality of third recesses 24C. The number of the third recesses 24C is set to four in accordance with the number of the conductors 3. The four third recesses 24C are arranged in a row along the first direction X. The four third recesses 24C are disposed at equal intervals, for example. Each of the third recesses 24C has a substantially planar rectangular shape. The longitudinal direction of the third recess 24C is the first direction X.

As illustrated in FIG. 3, the body 20 has a plurality of first through-holes 25. The conductors 3 are press-fitted into the first through-holes 25, respectively, and held by the first through-holes 25. Each of the first through-holes 25 has a sectional shape corresponding to that of the conductor 3, and has a rectangular shape, for example. The longitudinal direction in the sectional shape of the first through-hole 25 is the first direction X. The number of the first through-holes 25 included in the body 20 is four in accordance with the number of the conductors 3 to be inserted. The first through-holes 25 are disposed at equal intervals along the first direction X.

As illustrated in FIG. 6 and the like, the first through-holes 25 penetrate the body 20 along the height direction Z. One end of the first through-hole 25 is opened to a bottom surface 24k of the third recess 24C. The other end of the first through-hole 25 is opened to a tip end surface 23a of the protruding part 23. One first through-hole 25 is disposed for one third recess 24C. Note that the recess 24 and the first through-holes 25 may be combined and regarded as a continuous through-hole. In such a case, the through-hole is understood as a multi-step through-hole whose sectional area gradually decreases from the first surface 22a of the base 22 to the tip end surface 23a of the protruding part 23.

The wall part 21 is a rectangular flat plate-shaped component part and protrudes toward the height direction Z from the tip end surface 23a of the protruding part 23. As illustrated in FIG. 4, FIG. 7, and the like, the wall part 21 holds nuts 21a. Four nuts 21a are fixed to the wall part 21 of the present embodiment in correspondence with the four conductors 3. The nuts 21a are integrally formed with the wall part 21 by molding, for example. A screw hole 21b of each of the nuts 21a extends along the second direction Y. The first terminal part 31 of the conductor 3 and a terminal 105 of the first device 100 are co-fastened to the nut 21a by a bolt.

The housing 2 has a plurality of insulating walls 26. Each of the insulating walls 26 is a wall that divides between the adjacent conductors 3. The housing 2 of the present embodiment has three insulating walls 26 in correspondence with the four conductors 3. The insulating walls 26 protrude toward the second direction Y from the side surface of the protruding part 23 and the wall part 21. The insulating walls 26 extend along the height direction Z from the second surface 22b of the base 22 to a tip end surface 21c of the wall part 21.

As illustrated from FIG. 8 to FIG. 11, the sealing member 1 has a plurality of sealing parts 40 and a connecting part 41. The sealing member 4 is an insulating member having a mat seal shape in which a plurality of O-rings are connected in series. The sealing member 4 of the present embodiment has four sealing parts 40 in correspondence with the four conductors 3. The four sealing parts 40 are disposed in a row along the first direction X. The four sealing parts 40 are disposed at equal intervals, for example. The sealing parts 40 and the connecting part 41 are integrally molded by a resin such as rubber. The material of the sealing member 4 is a material having resistance to the first liquid 104, and is, for example, oil-resistant acrylic rubber and the like.

The sealing parts 40 seal between the conductors 3 and the housing 2. The shape of each of the sealing parts 40 is annular, for example, tubular. The sectional shape of the sealing part 40 of the present embodiment is elliptical or rectangular. The longitudinal direction of the sealing part 40 is the first direction X. The sealing part 40 is a shaft seal whose inner peripheral surface is in close contact with the conductor 3 and whose outer peripheral surface is in close contact with the housing 2. The sealing part 40 is provided on the outer peripheral surface thereof with an annular lip 42.

As illustrated in FIG. 8 and the like, the connecting part 41 has a flat plate shape. The connecting part 41 has a first surface 41a and a second surface 41b. The first surface 41a is a surface facing the second device 200. The first surface 41a faces upward when the first device 100 and the second device 200 are installed in a vehicle, for example. The second surface 41b is a surface opposite to the first surface 41a. The second surface 41b faces downward when the first device 100 and the second device 200 are installed in a vehicle, for example. The sealing parts 40 protrude toward the height direction Z from the second surface 41b.

As illustrated in FIG. 2 and FIG. 10, the connecting part 41 has recesses 43. Protrusions 54 of the holding body 5 to be described below are inserted into the recesses 43, respectively. The connecting part 41 of the present embodiment has four recesses 43 in correspondence with the four conductors 3. The four recesses 43 are arranged in a row along the first direction X. The four recesses 43 are disposed at equal intervals, for example. The recesses 43 are recessed along the height direction Z from the first surface 41a toward the second surface 41b. That is, the recesses 43 are opened toward the height direction Z on the first surface 41a. In the plan view, each of the recesses 43 has a substantially elliptical shape. The longitudinal direction of the recess 43 is the first direction X.

As illustrated in FIG. 10 and the like, the sealing member 4 has a plurality of through-holes 44 into which the conductors 3 are inserted, respectively. Each of the through-holes 44 has a substantially sectional rectangular shape. The longitudinal direction in the sectional shape of the through-hole 44 is the first direction X. The sealing member 4 has four through-holes 44 in correspondence with the four conductors 3. The four through-holes 44 are disposed at equal intervals, for example. The through-holes 44 penetrate the connecting part 41 and the sealing parts 40 along the height direction Z. One end of the through-hole 44 is opened to a bottom surface 43a of the recess 43. The other end of the through-hole 44 is opened to a tip end surface 40a of the sealing part 40. One through-hole 44 is disposed for one sealing part 40. Note that the recess 43 and the through-holes 44 may be combined and regarded as one continuous through-hole. In such a case, the through-hole is understood as a through-hole that penetrates from the first surface 41a of the connecting part 41 to the tip end surface 40a of the sealing part 40 and has a smaller sectional area on the tip end surface 40a side than the bottom surface 43a.

As illustrated from FIG. 12 to FIG. 15, the holding body 5 has the fitting part 50, the covering parts 51, the insulating walls 52, connecting parts 53, and the protrusions 54. The fitting part 50, the covering parts 51, the insulating walls 52, the connecting parts 53, and the protrusions 54 are integrally molded with one another. The fitting part 50 has a rectangular plate shape or a rectangular parallelepiped shape. The fitting part 50 is fitted into the first recess 24A of the housing 2 and supported by the first recess 24A. The fitting part 50 is integrally formed with the bodies 30 of the conductors 3 and connects the four conductors 3. The fitting part 50 is located at intermediate parts of the bodies 30 in the height direction Z.

As illustrated in FIG. 13 and the like, the fitting part 50 has a first side surface 50c and a second side surface 50d. The first side surface 50c and the second side surface 50d are side surfaces facing the second direction Y. The fitting part 50 has a first rib 50a and a second rib 50b. The first rib 50a protrudes toward the second direction Y from a central part of the first side surface 50c of the fitting part 50. The second rib 50b protrudes toward the second direction Y from a central part of the second side surface 50d of the fitting part 50. The first rib 50a is guided by the first groove 21d of the housing 2. The second rib 50b is guided by the second groove 24e of the housing 2. In the first direction X, the width of the first rib 50a is smaller than that of the second rib 50b.

Each of the covering parts 51 individually surrounds the body 30 of the conductor 3. That is, the holding body 5 has one covering part 51 for one body 30. The covering part 51 extends from the fitting part 50 along the body 30. More specifically, the covering part 51 extends from the fitting part 50 toward the second terminal part 32 of the conductor 3 along the height direction Z. Between adjacent covering parts 51, a slit-shaped gap is provided. A tip end surface 51a of the covering part 51 is located slightly closer to the fitting part 50 side than the second terminal part 32. That is, an end part of the body 30 on the second terminal part 32 side protrudes from the covering part 51. Each of the covering parts 51 is integrally formed with a corresponding body 30. The covering part 51 of the present embodiment has a substantially sectional rectangular shape.

The insulating wall 52 is a wall part that divides two adjacent second terminal parts 32. The insulating wall 52 is provided at the tip end of the covering part 51. The insulating wall 52 has a curved part 52a and a flat plate part 52b. The curved part 52a is connected to an end part, at the tip end of the covering part 51 in the first direction X. The curved part 52a extends toward a direction away from the tip end of the covering part 51 along the first direction X and the height direction Z. As illustrated in FIG. 12, the shape of the curved part 52a when viewed directly from the second direction Y is a curved shape. The curved part 52a is curved such that a gap with an outer peripheral surface 32b of the second terminal part 32 is substantially constant. That is, the curved part 52a is curved toward a direction away from the second terminal part 32. The shape of the curved part 52a is, for example, an arc shape concentric with the center of the second terminal part 32.

The flat plate part 52b is a part formed in a flat plate shape. The flat plate part 52b is connected to the tip end of the curved part 52a. In other words, the flat plate part 52b is connected, to the covering part 51 via the curved part 52a. The flat plate part 52b extends toward a direction away from the covering part 51 along the height direction Z. As illustrated in FIG. 12, the shape of the flat plate part 52b when viewed directly from the second direction Y is a linear shape. The flat plate part 52b is located in the middle between two adjacent second terminal parts 32 in the first direction X.

The holding body 5 of the present embodiment has three insulating walls 52. Among the four covering parts 51 arranged in the first direction X, the covering part 51 at one end is provided with no insulating wall 52 and the remaining three covering parts 51 are provided with the insulating walls 52, respectively. As illustrated in FIG. 13 and FIG. 14, a width Wd1 of the insulating wall 52 along the second direction Y is larger than a thickness t1 of the covering part 51.

The protrusion 54 protrudes toward the height direction Z from a lower surface 50e of the fitting part 50. The protrusion 54 is integrally formed with the body 30 so as to surround the body 30 of the conductor 3. The protrusion 54 serves as an O-ring stopper that supports the sealing part 40. One protrusion 54 is formed for one conductor 3. As illustrated in FIG. 15, in the plan view, the protrusion 54 has an elliptical shape. The shape of the protrusion 54 corresponds to the shape of the recess 43 of the sealing member 4 and the shape of the sealing part 40.

As illustrated in FIG. 12, the connecting part 53 connects adjacent covering parts 51. More specifically, the connecting part 53 connects a first surface 51b of one covering part 51 and a second surface 51c of the adjacent covering part 51. The first surface 51b is one of the two side surfaces facing the first direction K. The first surface 51b is located on a side where the insulating wall 52 is provided. The second surface 51c is the other of the two side surfaces facing the first direction K. The second surface 51c is located on a side opposite to the side where the insulating wall 52 is provided. The connecting part 53 has a flat plate shape. In the front view, the connecting part 53 has a rectangular shape. A height Ht1 of the connecting part 53 is a larger than a width Wd2 of the connecting part 53. The height Ht1 of the connecting part 53 is a dimension of the connecting part 53 along the height direction Z and the width Wd2 of the connecting part 53 is a dimension of the connecting part 53 along the first direction K.

The connecting part 53 is disposed at a position apart, from the fitting part 50 in the extension direction of the covering part 51. The connecting part 53 may be provided at a position near the tip end surface 51a. The connecting part 53 is disposed, for example, on the tip end surface 51a side with respect to a middle point of the covering part 51 in the height direction 3.

As illustrated in FIG. 16, the connecting part 53 is located on a line connecting two adjacent bodies 30. That is, the bodies 30 and the connecting parts 53 are located on the same line. A thickness t2 of the connecting part 53 is smaller than a thickness t1 of the covering part 51. Due to the difference between the thicknesses of the connecting part 53 and the covering part 51, a recess 55 is formed. The recess 55 is formed by the first surface 51b, the second surface 51c, and the connecting part 53. The recess 55 is formed on both sides of the connecting part 53 in the second direction Y.

In the connector 1 of the present embodiment, the holding body 5 is provided with the connecting part 53, so that the moldability of the holding body 5 is improved. For example, even though a force for relatively moving adjacent covering parts 51 is generated during cooling after molding, the relative movement is restricted by the connecting part 53. That is, the connecting part 53 can restrict the deformation of the holding body 5 during the cooling. Furthermore, the connecting part 53 can restrict the deformation of the holding body 5 during transportation or in an assembly process. Moreover, in a mold for molding the holding body 5, spaces corresponding to the covering parts 51 are communicated with each other by a space corresponding to the connecting part 53. Thus, the fluidity of a resin during molding is improved.

Details of the connecting part 53 of the embodiment will be described. As illustrated in FIG. 12 and FIG. 17, the connecting part 53 has grooves 56. The grooves 56 extend along the height direction Z. In other words, the grooves 56 extend along the covering parts 51. The grooves 56 of the present embodiment are formed from one end to the other end of the connecting part 53 along the height direction Z. The grooves 56 are provided on both sides of the connecting part 53.

The connecting part 53 is provided on one side thereof with two grooves 56. One groove 56 is disposed at each of one end part and the other part in the first direction X. That is, one of the two grooves 56 is located in the vicinity of the first surface 51b and extends along the first surface 51b. The other of the two grooves 56 is located in the vicinity of the second surface 51c and extends along the second surface 51c.

The sectional shape of the groove 56 is such that the width thereof in the first direction becomes narrower toward the bottom of the groove 56. The sectional shape of the groove 56 is, for example, a triangle. The arrangement of the groove 56 on one surface 53a of the connecting part 53 and the arrangement of the groove 56 on another surface 53b correspond to each other. The groove 56 formed on the one surface 53a and the groove 56 formed on the other surface 53b face each other in the second direction Y. By providing the grooves 56 as described above, the connecting part 53 is easily cut at the position of the groove 56.

Next, an example of the procedure for assembling the connector 1 will be described. As illustrated in FIG. 18, the sealing member 4 is attached to the conductor unit 6. The first terminal parts 31 of the conductors 3 are inserted into the through-holes 44 from the recesses 43 of the sealing member 4, respectively. The protrusions 54 of the holding body 5 are fitted into the recesses 43 of the sealing member 4, respectively.

Next, as illustrated in FIG. 19, the conductor unit 6 and the sealing member 4 are assembled to the housing 2. The conductor unit 6 and the sealing member 4 are inserted into the recess 24 of the housing 2 with the first terminal parts 31 as a head. The sealing parts 40 of the sealing member 4 are inserted into the third recesses 24C of the housing 2, respectively. The connecting part 41 of the sealing member 4 is inserted into the second recess 24B. The connecting part 41 is received in the second recess 24B of the housing 2 and supported by the bottom surface 24j of the second recess 24B. The fitting part 50 of the holding body 5 is inserted into the first recess 24A of the housing 2. The conductors 3 are press-fitted into the first through-holes 25 of the housing 2, respectively, so that the conductor unit 6 is held by the housing 2.

When the assembly of the conductor unit 6 and the sealing member 4 to the housing 2 is completed, the connecting parts 53 are cut. A cutting step of cutting the connecting parts 53 is performed using, for example, a cutting machine or a jig. In the cutting step, the connecting part 53 is separated from the covering part 51 and removed. With this, as illustrated in FIG. 20 and FIG. 21, cutting marks 57 are formed in the holding body 5. The cutting marks 57 are formed on the first surface 51b and the second surface 51c, respectively. In other words, the cutting mark 57 is formed in a part of the covering part 51 that faces another adjacent covering part 51. The cutting mark 57 formed on the first surface 51b and the cutting mark 57 formed on the second surface 51c face each other in the first direction X.

As illustrated in FIG. 22, the cutting mark 57 is a cut surface formed on the covering part 51 or the connecting part 53. The cutting mark 57 is a surface formed by a force applied to cut the connecting part 53, and is, for example, a surface formed by shear failure. The cutting mark 57 illustrated in FIG. 22 is formed at a position where the groove 56 was formed. That is, the cutting mark 57 is formed so as to connect two grooves 56 facing each other. In the connector 1 of the present embodiment, when a force for cutting the connecting part 53 is applied, stress concentration occurs in the groove 56. That is, the connecting part 53 is easily cut at the groove 56. Accordingly, in the cutting step, a part between the groove 56 on the first surface 51b and the groove 56 on the second surface 51c is separated from the covering part 51.

By cutting the connecting part 53 in the groove 56, a part of the connecting part 53 remains in the covering part 51 as a remaining part 53c. The remaining part 53c may have an inclined surface 56a that is a part of the groove 56. The surface roughness of the cutting mark 57 is rougher than that of the inclined surface 56a.

By cutting the connecting parts 53, the flexibility of the conductor unit 6 is improved. For example, two adjacent conductors 3 more easily move relatively. With this, workability when the second terminal part 32 is fixed to the second device 200 is improved, or stability of an electric connection between the second terminal part 32 and the second device 200 is improved. Furthermore, by cutting the connecting parts 53, a creepage distance between two adjacent conductors 3 is increased as compared with a case before the connecting parts 53 are cut. The holding body 5 of the present embodiment is configured such that a desired creepage distance can be secured between two adjacent conductors 3 in the state in which the connecting parts 53 have been cut.

FIG. 23 illustrates the connector 1 attached to the casing 101 of the first device 100. The housing 2 of the connector 1 is fixed to the upper wall part 101a by the bolts 9. Between the housing 2 and the wall part 101a, for example, a face seal is interposed. The terminal of the first device 100 is connected to the first terminal part 31 of the conductor 3, and the terminal of the second device 200 is connected to the second terminal part 32 of the conductor 3.

As described above, the connector 1 of the present embodiment has the insulating housing 2, the conductor unit 6, and the sealing member 4. The housing 2 is fixed to the casing 101 of the first device 100 at the communication part 10 through which the opening 101b the first device 100 and the opening 201b of the second device 200 communicate with each other. The conductor unit 6 has the conductors 3 disposed in a row and the insulating holding body 5. The holding body 5 is integrally molded with the conductors 3.

Each of the conductors 3 has the plate-shaped body 30 and the terminal parts 31 and 32 provided at both ends of the body 30, respectively. The holding body 5 has the fitting part 50, the covering parts 51, and the connecting parts 53. The fitting part 50 is a part fitted to the housing 2. Each of the covering parts 51 extends from the fitting part 50 along the body 30 and individually surrounds the body 30. Each of the connecting parts 53 is a part that connects adjacent covering parts 51 at a position separated from the fitting part 50.

In accordance with the connector 1 of the present embodiment, adjacent covering parts 51 are connected via the connecting part 53, so that the deformation of the holding body 5 during cooling and the like is suppressed. Furthermore, by cutting the connecting part 53, a continuous deep gap is formed between the adjacent covering parts 51. Thus, in accordance with the connector 1 of the present embodiment, it is easy to secure a creepage distance between the conductors 3.

The thickness t2 of the connecting part 53 of the present embodiment is smaller than the thickness t1 of the covering part 51. Thus, it is easy to separate the connecting part 53 from the covering part 51.

The connecting part 53 of the present embodiment has the grooves 56 extending along the covering part 51. Thus, the connecting part 53 is easily cut along the grooves 56. The positions of the grooves 56 are determined such that a creepage distance between the conductors 3 can be appropriately secured.

The grooves 56 may be provided on both surfaces of the connecting part 53. By providing the grooves 56 on both surfaces of the connecting part 53, the connecting part 53 can be easily cut.

The holding body 5 of the present embodiment has the insulating walls 52. Each of the insulating walls 52 is provided at the tip end of the covering part 51 and divides two adjacent second terminal parts 32. The covering part 51 and the insulating wall 52 are provided to one member, so that the reduction of the number of parts and the like are possible. Furthermore, the covering part 51 and the insulating wall 52 are integrally formed with each other, so that the insulating performance of the holding body 5 is improved.

In the connector 1 of the present embodiment, after the connecting part 53 is cut, the cutting marks 57 are formed in the covering part 51. The cutting mark 57 is formed in a part of the covering part 51 that faces another adjacent covering part 51. In the connector 1 having such cutting marks 57, the holding body 5 is provided with the connecting part 53 during molding and the connecting part 53 is cut after the molding. Thus, such a connector 1 can suppress the deformation of the holding body 5 and secure a creepage distance between the conductors 3.

First Modification of Embodiment

Figure 24:
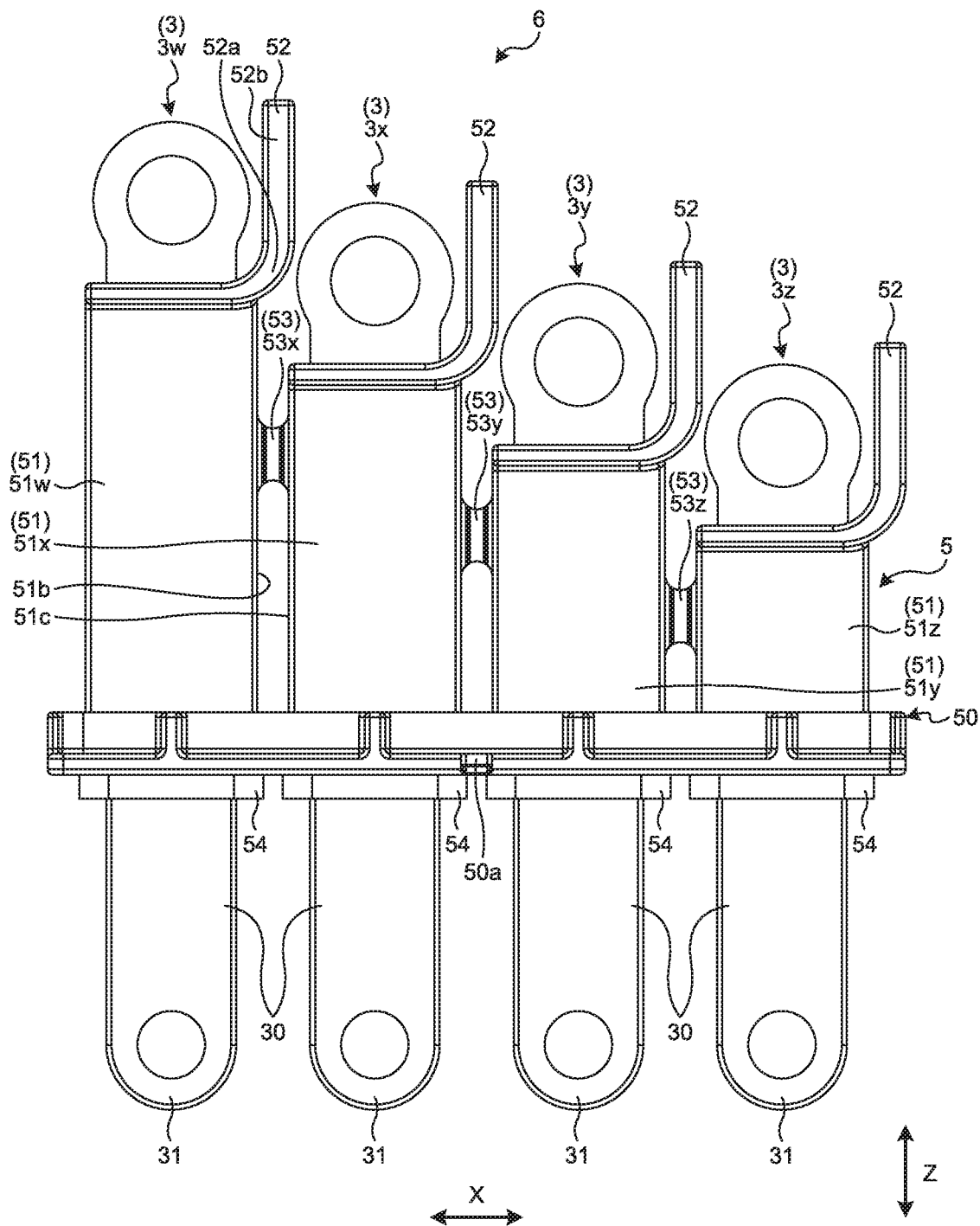
FIG. 24 is a front view illustrating a conductor unit according to a first modification of the embodiment.
Figure 25:
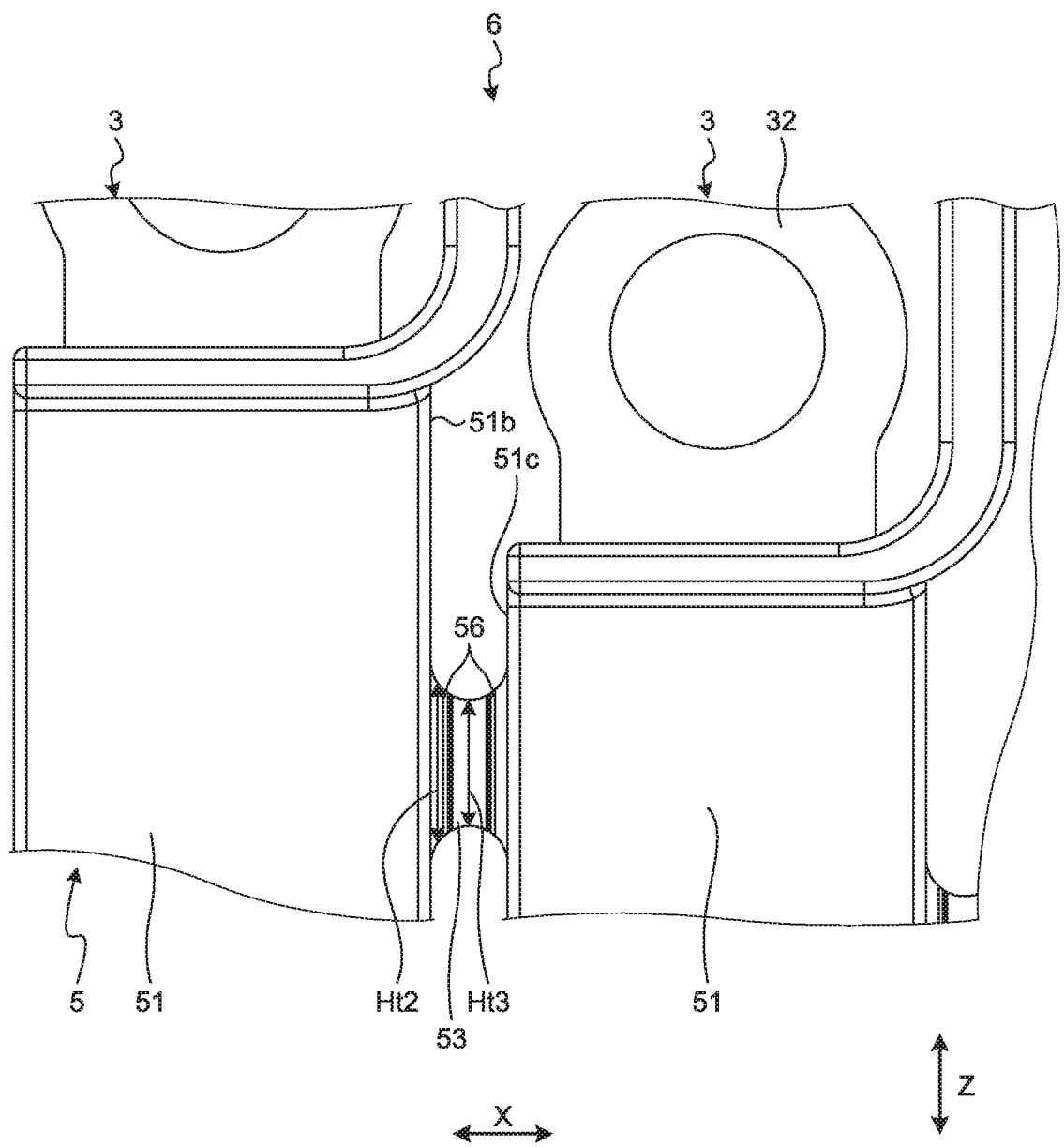
FIG. 25 is an enlarged view illustrating the conductor unit according to the first modification of the embodiment.

A first modification of the embodiment will be described. FIG. 24 is a front view illustrating a conductor unit according to the first modification of the embodiment, and FIG. 25 is an enlarged view illustrating the conductor unit according to the first modification of the embodiment. A conductor unit 6 according to the first modification of the embodiment is different from the conductor unit 6 of the aforementioned embodiment in that the conductor unit 6 includes conductors 3 having different lengths, for example.

As illustrated in FIG. 24, the conductor unit 6 according to the first modification has four conductors 3 and a holding body 5. All the four conductors 3 have different lengths. In the following description, the longest conductor 3 is referred to as a first conductor 3w. Furthermore, the second longest conductor 3 is referred to as a second conductor 3x, the third longest conductor 3 is referred to as a third conductor 3y, and the shortest conductor 3 is referred to as a fourth conductor 3z. The four conductors 3 are arranged in the order of length from the first conductor 3w to the fourth conductor 3z. Furthermore, the four conductors 3 are arranged such that all first terminal parts 31 are at the same position in the height direction Z. Accordingly, in relation to the protruding length protruding from a fitting part 50, the protruding length of the first conductor 3w is the longest and the protruding length of the fourth conductor 3z is the shortest.

The holding body 5 has the fitting part 50, covering parts 51, insulating walls 52, connecting parts 53, and protrusions 54. One covering part 51 is provided for each of the four conductors 3. In the following description, the covering part 51 surrounding the first conductor 3w is referred to as a first covering part 51w, the covering part 51 surrounding the second conductor 3x is referred to as a second covering part 51x, the covering part 51 surrounding the third conductor 3y is referred to as a third covering part 51y, and the covering part 51 surrounding the fourth conductor 3z is referred to as a fourth covering part 51z. Among the four covering parts 51w to 51z, the first covering part 51w is the longest and the fourth covering part 51z is the shortest. In the conductor unit 6 of the first modification, the insulating walls 52 are provided on all the covering parts 51.

As illustrated in FIG. 25, each of the connecting parts 53 has two grooves 56 on one surface thereof. That is, the connecting part 53 has four grooves 56, similarly to the connecting part 53 of the aforementioned embodiment. The groove 56 extends from the upper end to the lower end of the connecting part 53 along the height direction Z. In the shape of the connecting part 53 of the first modification, a height Ht2 of both end parts thereof in the first direction X is relatively large and a height Ht3 of a central part thereof is relatively small. That is, in the connecting part 53, strength of both end parts thereof is relatively high and strength of the central part thereof is relatively low. Accordingly, in the cutting step, the covering part 51 is less likely to be damaged.

As illustrated in FIG. 24, the holding body 5 has three connecting parts 53. In the following description, the connecting part 53 that connects the first covering part 51w and the second covering part 51x is referred to as a first connecting part 53x. Furthermore, the connecting part 53 that connects the second covering part 51x and the third covering part 51y is referred to as a second connecting part 53y. The connecting part 53 that connects the third covering part 51y and the fourth covering part 51z is referred to as a third connecting part 53z.

Among the three connecting parts 53x to 53z, the first connecting part 53x is located farthest from the fitting part 50 in the height direction Z. The third connecting part 53z is located closest to the fitting part 50 in the height direction Z. The second connecting part 53y is located at an intermediate position between the first connecting part 53x and the third connecting part 53z in the height direction Z. The three connecting parts 53x to 53 are disposed in this manner, so that the moldability of the holding body 5 is improved. For example, the first connecting part 53x is located near the tip end of the first covering part 51w, so that a resin is easily up to the tip end of the first covering part 51w.

The three connecting parts 53x to 53z may be cut and removed at any stage. The timing at which the three connecting parts 53x to 53z are cut is, for example, after the conductor unit 6 is assembled to the housing 2.

Second Modification of Embodiment

The timing at which the connecting part 53 is cut is not limited to the illustrated timing. For example, the connecting part 53 may be cut after the holding body 5 is cooled and before the holding body 5 is assembled to the housing 2 or the sealing member 4. The shape and arrangement of the connecting parts 53 are not limited to the illustrated shape and arrangement.

The number and shape of the conductors 3 are not limited to the number and shape illustrated in the embodiment. The shapes of the housing 2, the sealing member 4, and the holding body 5 are appropriately designed according to the shape of the conductor 3. For example, in the holding body 5, the shape of the covering part 51 and the shape of the insulating wall 52 are designed according to the shape of the conductor 3. The shape of the sealing part 40 is not limited to the illustrated shape. Furthermore, the sealing part 40 is not limited to the shaft seal and may be a face seal. The first device 100 is not limited to the motor and the second device 200 is not limited to the inverter. Furthermore, the first liquid 104 is not limited to the oil and the second liquid 205 is not limited to the coolant.

The contents disclosed in the aforementioned embodiment and modifications can be combined and executed as appropriate.

In the conductor unit of the connector according to the present embodiment, the holding body has the fitting part fitted to the housing, the covering parts each extending from the fitting part along the body and individually surrounding the body, and the connecting parts each connecting adjacent covering parts at a position separated from the fitting part. In accordance with the connector of the present embodiment, the adjacent covering parts are connected via the connecting part, so that the deformation of the holding body during cooling and the like is suppressed. Furthermore, by cutting the connecting part, a creepage distance between adjacent conductors is increased. Thus, the connector according to the present embodiment has an effect of suppressing the deformation of the holding body and securing the creepage distance between the conductors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:
   an insulating housing that is fixed to a casing of a first device at a communication part through which an opening of the casing of the first device and an opening of a casing of a second device communicate with each other;
   a conductor unit that includes a plurality of conductors arranged in a row and an insulating holding body integrally molded with the conductors; and
   a sealing member that seals between the conductor unit and the housing, wherein
   each of the conductors includes a plate-shaped body and terminal parts provided at both ends of the body, respectively, and
   the holding body includes a fitting part fitted to the housing, a plurality of covering parts each extending from the fitting part along the body and individually surrounding the body, and a connecting part connecting the adjacent covering parts at a position separated from the fitting part.

2. The connector according to claim 1, wherein a thickness of the connecting part is smaller than a thickness of the covering part.

3. The connector according to claim 1, wherein
the connecting part is formed with a groove extending along the covering part.

4. The connector according to claim 2, wherein
the connecting part is formed with a groove extending along the covering part.

5. The connector according to claim 3, wherein
the groove is formed on both surfaces of the connecting part.

6. The connector according to claim 4, wherein
the groove is formed on both surfaces of the connecting part.

7. The connector according to claim 1, wherein
the holding body includes an insulating wall that is provided at a tip end of the covering part and divides the two adjacent terminal parts.

8. The connector according to claim 2, wherein
the holding body includes an insulating wall that is provided at a tip end of the covering part and divides the two adjacent terminal parts.

9. The connector according to claim 3, wherein
the holding body includes an insulating wall that is provided at a tip end of the covering part and divides the two adjacent terminal parts.

10. The connector according to claim 4, wherein
the holding body includes an insulating wall that is provided at a tip end of the covering part and divides the two adjacent terminal parts.

11. The connector according to claim 5, wherein
the holding body includes an insulating wall that is provided at a tip end of the covering part and divides the two adjacent terminal parts.

12. The connector according to claim 6, wherein
the holding body includes an insulating wall that is provided at a tip end of the covering part and divides the two adjacent terminal parts.

13. A connector comprising:
an insulating housing that is fixed to a casing of a first device at a communication part through which an opening of the casing of the first device and an opening of a casing of a second device communicate with each other;
a conductor unit that includes a plurality of conductors arranged in a row and an insulating holding body integrally molded with the conductors; and
a sealing member that seals between the conductor unit and the housing, wherein
each of the conductors includes a plate-shaped body and terminal parts provided at both ends of the body, respectively,
the holding body includes a fitting part fitted to the housing, and a plurality of covering parts each extending from the fitting part along the body and individually surrounding the body, and
a cutting mark is formed in a part of the covering part that faces another adjacent covering part.

\* \* \* \* \*